（12） United States Patent
Kimura

(10) Patent No.: US 9,618,789 B2
(45) Date of Patent: Apr. 11, 2017

(54) PLANAR LIGHTING APPARATUS AND LIQUID CRYSTAL DISPLAY APPARATUS

(71) Applicant: NLT Technologies, Ltd., Kanagawa (JP)

(72) Inventor: Hiroaki Kimura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 100 days.

(21) Appl. No.: 14/641,774

(22) Filed: Mar. 9, 2015

(65) Prior Publication Data

US 2015/0257232 A1  Sep. 10, 2015

(30) Foreign Application Priority Data

Mar. 10, 2014  (JP) ................... 2014-046122

(51) Int. Cl.
*G02F 1/1335* (2006.01)
*H05B 33/08* (2006.01)
(Continued)

(52) U.S. Cl.
CPC ... *G02F 1/133603* (2013.01); *H05B 33/0869* (2013.01); *G02F 1/13306* (2013.01);
(Continued)

(58) Field of Classification Search
CPC ............ G09G 3/3413; G09G 3/3426; G09G 2320/0646; G09G 2320/041;
(Continued)

(56) References Cited

U.S. PATENT DOCUMENTS 8,937,587 B2 * 1/2015 Nakajima ............... G01K 7/42
345/102
2008/0238860 A1  10/2008 Onodera
(Continued)

FOREIGN PATENT DOCUMENTS

JP  2006-126627  5/2006
JP  2006-276784  10/2006
(Continued)

*Primary Examiner* — Benjamin C Lee
*Assistant Examiner* — Xuemei Zheng
(74) *Attorney, Agent, or Firm* — Young & Thompson

(57) ABSTRACT

Provided are a planar lighting apparatus, a liquid crystal display apparatus, and a planar light source. The planar lighting apparatus includes a planar light source including light emitting elements, a first housing, a light emitting surface divided into light emitting regions, and a first temperature sensor disposed inside of the first housing. The planar lighting apparatus further includes a second housing covering the planar light source; a second temperature sensor disposed outside of the first housing and inside of the second housing; a light-source drive circuit including light-source drive section each driving and controlling the light emitting elements belonging to the corresponding light emitting region; a memory section; and a computing section calculating a driving condition of each light-source drive section and correcting the driving condition on the basis of measurement values of the first temperature sensor and the second temperature sensor, and setup information in the memory section.

10 Claims, 25 Drawing Sheets

(51) Int. Cl.
  *G02F 1/133* (2006.01)
  *G09G 3/34* (2006.01)
(52) U.S. Cl.
  CPC ............ *G02F 2001/133612* (2013.01); *G09G 3/3413* (2013.01); *G09G 3/3426* (2013.01); *G09G 2320/0233* (2013.01); *G09G 2320/041* (2013.01); *G09G 2360/145* (2013.01)
(58) Field of Classification Search
  CPC ............ H05B 33/0833; H05B 33/0845; H05B 33/0854; H05B 33/0872; H05B 33/0858; G02F 1/133602; G02F 1/133603; G02F 2001/133317; G02F 1/133611; G02F 1/133612
  See application file for complete search history.

(56) References Cited

U.S. PATENT DOCUMENTS

| | | | | |
|---|---|---|---|---|
| 2012/0106122 A1* | 5/2012 | Ryu | ................ | G02F 1/133608 362/19 |
| 2012/0212520 A1* | 8/2012 | Matsui | ................ | G09G 3/3611 345/690 |
| 2012/0274544 A1* | 11/2012 | Nakajima | ................ | G01K 7/42 345/101 |
| 2013/0321387 A1* | 12/2013 | Ohe | ................ | G09G 5/10 345/214 |

FOREIGN PATENT DOCUMENTS

| | | |
|---|---|---|
| JP | 2007-317479 | 12/2007 |
| JP | 2008-249780 | 10/2008 |

* cited by examiner

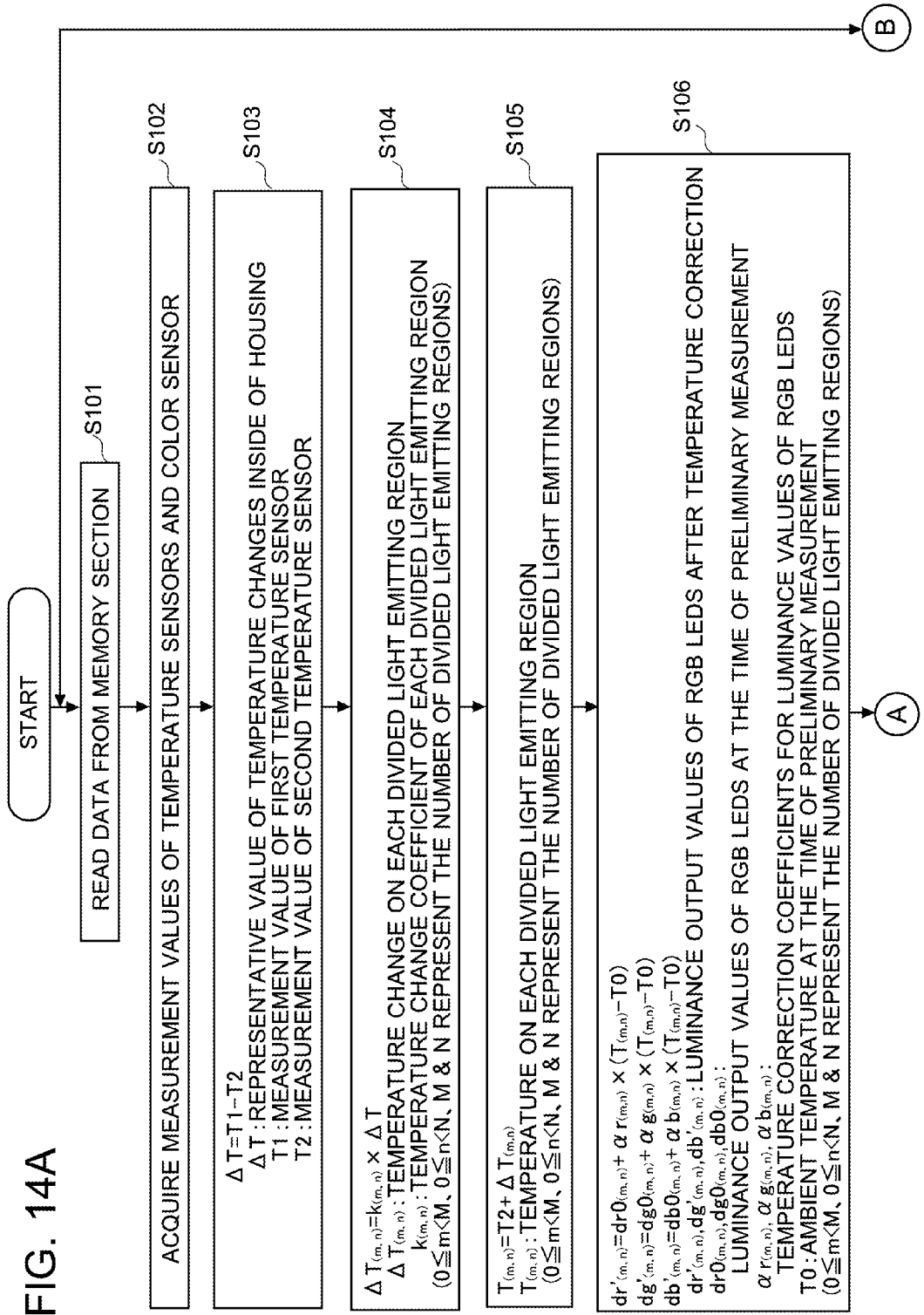

PLANAR LIGHTING APPARATUS AND LIQUID CRYSTAL DISPLAY APPARATUS

TECHNICAL FIELD

The present invention relates to a planar lighting apparatus and a liquid crystal display apparatus. In particular, the present invention relates to a planar lighting apparatus which uses LEDs (Light Emitting Diodes) as light emitting elements thereof and controls light emission of divided light emitting regions separately and to a liquid crystal display apparatus which uses the planar lighting apparatus as a light source thereof.

BACKGROUND

Liquid crystal display apparatuses are requested to provide uniform display indication. Further, in order to moderate individual differences among multiple display apparatuses at the time of being used in a multi-monitor mode, liquid crystal display apparatuses are demanded to provide uniform display quality such that the liquid crystal display apparatuses can exhibit fixed luminance and white balance, and exhibit no luminance unevenness (no ununiformity of luminance within a backlight surface thereof) and no color unevenness (no ununiformity of chromaticity within a backlight surface thereof). However, in a liquid crystal display apparatus, changes of luminance and white balance, luminance unevenness (ununiformity of luminance within the backlight surface) and color unevenness (ununiformity of chromaticity within the backlight surface) can be caused by various factors, such as distribution of luminance and color coming from the structure of its backlight source; distribution of transmittance and color coming from production variations in pixels of its liquid crystal panel; and individual variations and an aging change of its light source components.

In view of that, the following proposal has been made to provide an improvement to reduce luminance unevenness (ununiformity of luminance within the backlight surface), color unevenness (ununiformity of chromaticity within the backlight surface), and a change in white balance in a display region of a liquid crystal display apparatus. That is, there is provided a liquid crystal display apparatus in which LEDs with single color or different colors are used for its backlight source, and a light emitting region of the backlight source is divided into multiple regions. The divided multiple regions are controlled individually so as to achieve the above-described improvement.

Further, LEDs to be used as a light source greatly change in light emitting state depending on an aging change and a temperature condition. In view of that, another proposal has been made in order to maintain the uniform display indication. That is, there is provided a liquid crystal display apparatus employing color sensors, and the backlight source of the liquid crystal display apparatus includes LEDs disposed in multiple regions. The color sensors measure light emitted by LEDs in the multiple regions of the backlight source, and light emission of the LEDs in each of the multiple regions is corrected in accordance with the measurement values.

In liquid crystal display apparatuses having such a constitution that color sensors measure light emission of LEDs, a color sensor which can measure light quantities of RGB color components of received light by using color filters is mainly used, rather than a color sensor which can measure the chromaticity of received light, which is specified by the degree of human subjectivity, such as coordinates of the XYZ color space. LEDs are changed due to temperature not only in an amount of light emission, but also in emission spectrum. The change of LEDs in emission spectrum affects measurement values of the color sensor.

Further, also a color sensor itself is affected by temperature. Therefore, it is difficult to properly maintain the luminance and white balance of a display screen of a liquid crystal display apparatus. Accordingly, a proposal has been made so as to use a temperature sensor for measuring a temperature in order to correct the measurement values of the color sensors.

FIG. 24 illustrates a constitution of a conventional liquid crystal display apparatus described in Japanese Unexamined Patent Application Publication (JP-A) No. 2006-276784. As illustrated in FIG. 24, the liquid crystal display apparatus disclosed in JP-A No. 2006-276784 is equipped with a backlight, and includes light emitting diodes (LEDs) with three colors of red, green, and blue, a color sensor disposed with corresponding to the light emitting diodes, and a temperature sensor to measure the temperature of the light emitting diodes. The liquid crystal display apparatus further includes a control computing unit configured to correct two types of chromaticity change of the light emitting diodes, where one is a chromaticity change caused by the temperature of the light emitting diodes and the other is a chromaticity change which occurs at the time of adjusting the brightness of the red, green and blue light emitting diodes. Such a constitution reduces the chromaticity change of the light emitting diodes coming from the used environment and maintains an arbitral luminance and chromaticity of the backlight.

This constitution makes possible to correct the luminance and color of the whole display screen collectively in accordance with the temperature of the whole backlight, which can reduce changes in the luminance and the white balance of the whole screen.

However, in this constitution, the light emitting region of the backlight is not divided. Accordingly, this constitution does not adjust the luminance unevenness (ununiformity of luminance within the backlight surface) and the color unevenness (ununiformity of chromaticity within the backlight surface) inside of the backlight. Further, the backlight is provided with only one color sensor. When temperature distribution takes place at the inside of the backlight, the light emitting state of each LED at a different position in the backlight changes due to the temperature of the corresponding portion inside of the backlight, and the color sensor detects just the sum of light emitted by the LEDs in such various light emitting states. As a result, the above constitution has a problem that luminance unevenness (ununiformity of luminance within the backlight surface) and color unevenness (ununiformity of chromaticity within the backlight surface) take place. Furthermore, the backlight is provided with only one temperature sensor. Such a temperature sensor does not measure the temperature distribution inside of the backlight directly, and does not measure temperature distribution caused inside of the backlight due to self-heat generation of the LEDs in the backlight, separately from the temperature change of the whole backlight due to the ambient temperature. Therefore, the temperature distribution inside of the backlight is not estimated. Accordingly, the above constitution still has a problem that luminance unevenness (ununiformity of luminance within the backlight surface) and color unevenness (ununiformity of chromaticity within the backlight surface) take place on the display screen.

FIG. 25 illustrates a constitution of a conventional liquid crystal display apparatus described in JP-A No. 2008-249780. As illustrated in FIG. 25, the liquid crystal display apparatus in JP-A No. 2008-249780 includes a liquid crystal panel and a backlight panel which lights the liquid crystal panel from its back surface, and is configured to perform display based on image data. The liquid crystal display apparatus further includes a region luminance calculating unit (light adjustment controller), backlight luminance sensors, a controller and an LED driver, and is constituted as follows. The liquid crystal panel is divided into multiple display regions, and the region luminance calculating unit is configured to calculate the luminance of each of the multiple display regions on the basis of the image data. On the backlight panel, multiple backlight regions (backlight sections) are defined. The backlight luminance sensors are disposed in the multiple backlight regions, respectively, and each backlight luminance sensor is adapted to measure luminance of light emitted by the corresponding backlight regions. The controller is configured to adjust the luminance of each of the multiple backlight regions on the basis of the luminance of the corresponding display region and the luminance of light emitted by the corresponding backlight region. The LED driver is configured to drive LEDs (white LED element) of the backlight panel. Further, the backlight luminance sensor is made to include a temperature sensor and a light sensor.

Since this constitution is configured to separately adjust the luminance of each of the multiple backlight regions defined on the backlight panel, the luminance unevenness (ununiformity of luminance within the backlight surface) and color unevenness (ununiformity of chromaticity within the backlight surface) in the display screen can be corrected with the constitution, by adjusting the luminance of each region of the backlight properly. Further, since the backlight luminance sensor disposed in each of the backlight regions includes a temperature sensor and a light sensor, in the case where temperature distribution occurs inside of the backlight, it is possible for the backlight luminance sensor to measure directly the temperature distribution as far as the backlight regions are defined densely in comparison with the change of the occurring temperature distribution. Accordingly, even if a temperature distribution occurs inside of the backlight, it becomes possible to correct the luminance unevenness (ununiformity of luminance within the backlight surface) and the color unevenness (ununiformity of chromaticity within the backlight surface) caused on the screen due to the temperature distribution.

However, such constitution needs establishment of a large number of backlight regions so as to become sufficiently dense in comparison with the luminance unevenness (ununiformity of luminance within the backlight surface) and color unevenness (ununiformity of chromaticity within the backlight surface) which occur in the backlight, and with a temperature distribution which occurs inside of the backlight. It further needs a temperature sensor and an expensive light sensor to be disposed in each of a large number of regions. This constitution has a problem that the cost of such components increases greatly. Further, since the controller to adjust the luminance of each of the backlight regions, has an increased number of pins in order to communicate with a number of sensors, the circuit size of the controller becomes larger. Furthermore, an increase of the number of measurement parameters complicates computing processing of the controller, and needs the controller to have higher computing processing capability. Such condition also arises a problem that the cost increases.

FIG. 26 illustrates a constitution of a conventional lighting apparatus disclosed in JP-A No. 2007-317479. As illustrated in FIG. 26, the lighting apparatus disclosed in JP-A No. 2007-317479 includes a first light emitting region, a second light emitting region, a first photo-detector, a second photo-detector, and a light source controller, and is configured as follows. On the first light emitting region, a plurality of first light sources are disposed, and on the second light emitting region, a plurality of second light sources are disposed. When multiple light sources are in a lighting state, the first light emitting region becomes relatively high temperature, and the second light emitting region becomes relatively low temperature. The first photo-detector is adapted to receive mainly light emitted from the first light sources, and the second photo-detector is adapted to receive mainly light emitted from the second light sources. The light source controller is configured to control the plurality of first light sources collectively on the basis of the output of the first photo-detector and to control the plurality of second light sources collectively on the basis of the output of the second photo-detector.

According to this constitution, the light emitting regions are classified into the first light emitting region which becomes relatively high temperature and a second light emitting region which becomes relatively low temperature. The photo-detector is disposed for each kind of the light emitting regions, and each kind of the light emitting regions is controlled collectively on the basis of the output of the corresponding one of the photo-detectors. Accordingly, by conducting luminance adjustment for each kind of the light emitting regions, the constitution makes possible to correct the luminance unevenness (ununiformity of luminance within the light guide plate) and the color unevenness (ununiformity of chromaticity within the light guide plate) of the lighting apparatus. Further, even when temperature distribution occurs inside of the lighting apparatus, such constitution indirectly measures the light quantity of the high temperature region and the light quantity of the low temperature region without measuring directly the temperature distribution. Accordingly, by correcting a change of light sources caused due to the occurring temperature distribution, such constitution can reduce the luminance unevenness (ununiformity of luminance within the light guide plate) and the color unevenness (ununiformity of chromaticity within the light guide plate) of the lighting apparatus caused due to the temperature distribution as far as the temperature is distributed inside of the lighting apparatus one-dimensionally and the high temperature portions and the low temperature portions appear line-symmetrically in the lighting apparatus.

However, when the temperature is distributed inside of the lighting apparatus two-dimensionally, such lighting apparatus needs a large number of regions defined so as to become sufficiently dense in comparison with the temperature distribution occurring inside of the backlight. It means that the lighting apparatus further needs an expensive optical sensor for each of the large number of regions, and the above constitution has a problem that the cost of such components increases greatly. Furthermore, most of color sensors are generally configured to measure light quantities of RGB color components of received light by using color filters, rather than to measure the chromaticity of received light, which is specified by the degree of human subjectivity, such as coordinates of the XYZ color space. LEDs are changed due to temperature not only in an amount of light emission, but also in emission spectrum. The change of LEDs in emission spectrum affects measured values of the color sensor. Further, also a color sensor itself is affected by temperature. Therefore, it is difficult for the lighting apparatus without employing a temperature sensor to properly maintain the luminance and white balance. Furthermore, in the case where the luminance of LEDs deteriorates due to the use for long term, it becomes necessary to operate the LEDs with greater power. However, in such a situation, as compared with the initial stage of the product, the temperature change at the inside of the lighting apparatus becomes larger, and the above-described influence of the change of the LEDs in light emission spectrum onto the color sensor further increases. Accordingly, it becomes more difficult for such lighting apparatus to maintain the luminance and the white balance, which is a problem.

FIG. 27 illustrates a constitution of a conventional liquid crystal display apparatus disclosed in JP-A No. 2006-126627. As illustrated in FIG. 27, the liquid crystal display apparatus disclosed in JP-A No. 2006-126627 has the following constitution. A liquid crystal display panel, which includes multiple display pixels, is attached to a housing and is configured to display images on the basis of image signals. The liquid crystal display apparatus includes an internal temperature sensor to measure the back surface temperature of the liquid crystal display panel, and a temperature sensor to measure a temperature outside of the housing. A control section stores to a ROM (Read Only Memory), data to be used for estimation of a temperature on a display surface of the liquid crystal display panel based on the respective temperatures measured by the both sensors, where the data is in the form of a table. At the time of actuating an ODC (Over Drive Control) circuit, the control section operates the ODC circuit to read the data from the ROM on the basis of the temperatures measured by the both sensors, and to adjust an overshoot voltage and an undershoot voltage of the ODC circuit.

If there is provided a liquid crystal display apparatus in which only an internal temperature sensor measures the temperature of the liquid crystal display panel and the overshoot voltage and the undershoot voltage are determined by using the measured temperature, the following problems may arise. With such construction, a rapid change of the outside air temperature can cause the construction to erroneously determine the temperature of the liquid crystal display panel, the ODC circuit may use an erroneous overshoot voltage and undershoot voltage, and then, the function of the ODC circuit is not sufficiently exhibited, which may prevent reduction of the blur (unclearness) of a displayed image. Further, such situation may make the condition that the voltage of a pixel electrode becomes a state of exceeding a target transmittance and the corresponding pixel may show erroneous color. JP-A No. 2006-126627 describes that the disclosed constitution can solve all of these problems.

However, the technology disclosed in JP-A No. 2006-126627 relates to an overshoot drive of the liquid crystal display apparatus, in which the temperature of the liquid crystal panel in contact with the outside air is corrected. The disclosed technique is to estimate the temperature of a liquid crystal panel on the basis of an outside air temperature which greatly changes depending on the surrounding environment and of a temperature measured with an inner temperature sensor at a position distant from the liquid crystal panel, in place of measuring the temperature of the liquid crystal panel surface directly. For this reason, if the apparatus does not determine an amount of the correction properly for all the possible situations caused by the outside air temperature which can rapidly change depending on the surrounding environment and on a working condition, a problem remains in that the apparatus hardly performs an accurate correction. In JP-A No. 2006-126627, there is a description about the temperature correction using a panel representative value, but there is no description about a temperature distribution at the inside of the backlight. That is, the document does not describe about a problem that luminance unevenness (ununiformity of luminance within the backlight surface) and color unevenness (ununiformity of chromaticity within the backlight surface) occur on the display screen.

The present invention seeks to solve the problems.

SUMMARY

In view of the above-described problems, there are provided illustrative planar lighting apparatuses having a flat or curved light emitting surface, in which there is realized a planar light source with uniform quality, such as fixed luminance and color temperature, and no luminance unevenness (no ununiformity of luminance within the backlight surface) and color unevenness (no ununiformity of chromaticity within the backlight surface),with a constitution being inexpensive and not causing a sharp increase in cost.

Further, there are provided liquid crystal display apparatuses which realizes a uniform display quality such as a fixed luminance and white balance and no luminance unevenness (no ununiformity of luminance within the backlight surface) and color unevenness (no ununiformity of chromaticity within the backlight surface), with a constitution being inexpensive and not causing a sharp increase in cost.

A planar lighting apparatus as one embodiment of the present invention comprises a planar light source which includes a plurality of light emitting elements with single color or multiple colors, a first housing which covers the plurality of light emitting elements, a light emitting surface formed by the plurality of light emitting elements and divided into a plurality of light emitting regions, and a first temperature sensor disposed inside of the first housing. The planar lighting apparatus further comprises a second housing which covers the planar light source, a second temperature sensor disposed outside of the first housing and inside of the second housing, a light-source drive circuit including a plurality of light-source drive sections each of which drives and controls the light emitting elements belonging to the corresponding light emitting region, and a memory section to memorize setup information. The planar lighting apparatus further comprises a computing section which calculates a driving condition of each of the plurality of light-source drive sections, and corrects the driving condition of each of the plurality of light-source drive sections on a basis of a measurement value of the first temperature sensor, a measurement value of the second temperature sensor, and the setup information in the memory section.

A liquid crystal display apparatus as one embodiment of the present invention comprises a liquid crystal panel, and the above-described planar lighting apparatus being a backlight source for lighting the liquid crystal panel.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 3A is a plan view of backlight source viewed from the front side of an LED mounting board, and FIG. 3B is a plan view of backlight source viewed from the back side of the LED mounting board;

FIGS. 14A and 14B illustrate a flowchart of the processing of a computing section mounted on an LED drive board according to the first example;

DETAILED DESCRIPTION

Figure 1:
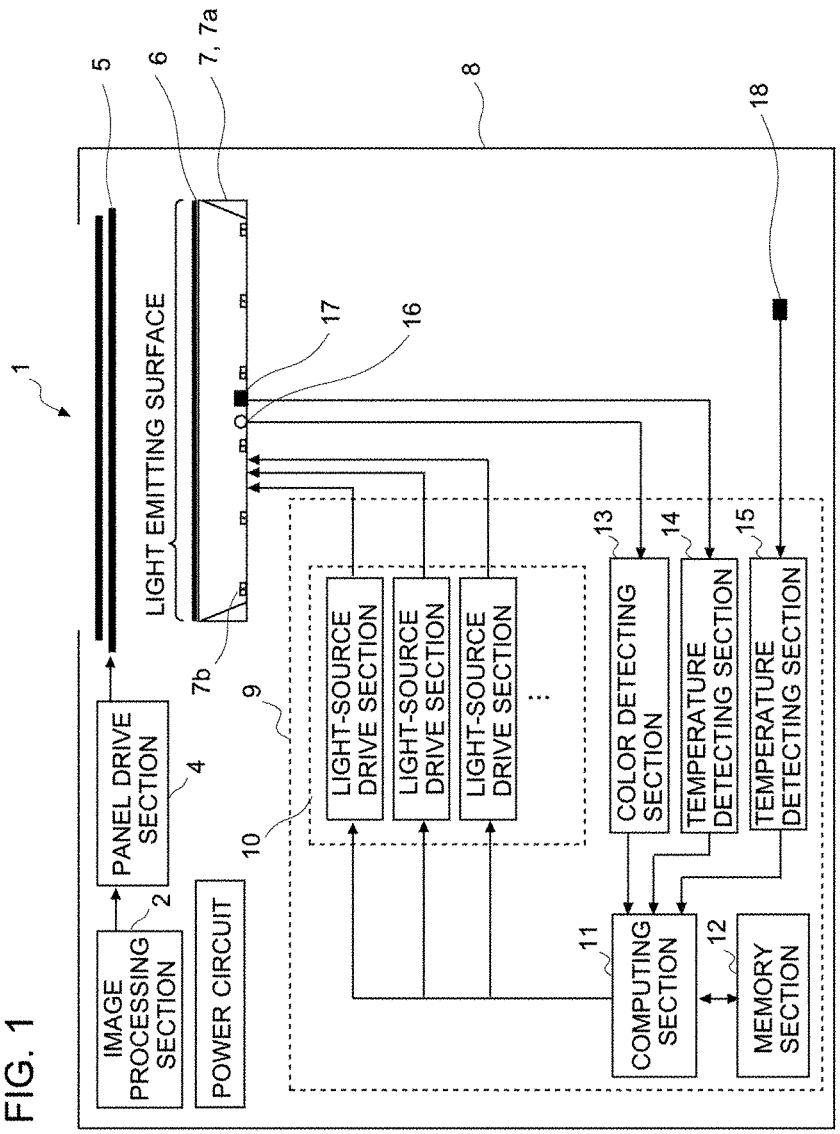
FIG. 1 is a diagram schematically illustrating a constitution of a liquid crystal display apparatus according to the first example.

Illustrative embodiments of planar lighting apparatuses and liquid crystal display apparatuses will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to an illustrative planar lighting apparatus, it is possible to realize a planar light source with uniform quality, such as fixed luminance and color temperature, and no luminance unevenness (no ununiformity of luminance within the backlight surface) and color unevenness (no ununiformity of chromaticity within the backlight surface), with a constitution being inexpensive and not causing a sharp increase in cost. According to an illustrative liquid crystal display apparatus, it is possible to realize a uniform display quality such as a fixed luminance and white balance and no luminance unevenness (no ununiformity of luminance within the backlight surface) and color unevenness (no ununiformity of chromaticity within the backlight surface), with a constitution being inexpensive and not causing a sharp increase in cost.

The reason is that the following planar lighting apparatus is provided to be used as a backlight source of a liquid crystal display apparatus. The planar lighting apparatus includes a planar light source which includes a plurality of light emitting elements with single color or multiple colors, a first housing which covers the plurality of light emitting elements, and a light emitting surface formed by the plurality of light emitting elements and divided into a plurality of light emitting regions. The planar lighting apparatus further includes a second housing which covers the planar light source, a light-source drive circuit including a plurality of light-source drive sections each of which drives and controls the light emitting elements belonging to the corresponding light emitting region, a memory section to memorize setup information, and a computing section which calculates a driving condition of each of the plurality of light-source drive sections. The planar lighting apparatus further includes a first temperature sensor disposed inside of the first housing, and a second temperature sensor disposed outside of the first housing and inside of the second housing. The computing section corrects the driving condition of each of the plurality of light-source drive sections on a basis of a measurement value of the first temperature sensor, a measurement value of the second temperature sensor, and the setup information in the memory section. Here, the temperature sensor may be a thermocouple or a thermistor, and any kind of the temperature sensor may be employed.

As described in the descriptions of the background, there has been proposed a technology that a liquid crystal display apparatus with a backlight source including LEDs with single color or multiple colors, the light emitting region is divided into plural regions to be controlled separately, to reduce luminance unevenness (ununiformity of luminance within a backlight surface thereof), color unevenness (ununiformity of chromaticity within a backlight surface thereof), and a change of white balance in a display region of the liquid crystal display apparatus. Further, since the light emitting state of the LEDs as a light emitting source greatly changes depending on an aging change and a temperature condition thereof, there has been proposed another technology to measure LED light emission in plural regions by a color sensor and to correct the LED light emission in the plural regions. Furthermore, since LEDs change in light emission spectrum depending on temperature and a color sensor itself changes in characteristics depending on temperature, there has been proposed another technology to detect a temperature with a temperature sensor.

If a color sensor and a temperature sensor are disposed in each of the divided regions in order to suppress surely the luminance unevenness (ununiformity of luminance within a backlight surface thereof) and the color unevenness (ununiformity of chromaticity within a backlight surface thereof) of LEDs, such a construction increases the number of components (in particular, expensive color sensor), and the cost of such a constitution increases. Further, since such a construction needs processing of the measurement values of a large number of color sensors and temperature sensors, the control operations become complicated. On the other hand, if temperature is measured with only one temperature sensor, an occurrence of a temperature distribution on the backlight source makes a sufficient control of the luminance unevenness (ununiformity of luminance within a backlight surface thereof) and color unevenness (ununiformity of chromaticity within a backlight surface thereof) difficult. Namely, in order to reduce the cost and to effectively control the luminance unevenness (ununiformity of luminance within the backlight surface) and color unevenness (ununiformity of chromaticity within the backlight surface) in a backlight source, it becomes important to determine the number of color sensors and temperature sensors to be used, the locations to arrange them, and the method to process the measurement values of them.

In view of that, one embodiment of the present invention has the following constitution. A planar lighting apparatus includes a first temperature sensor disposed in a first housing which covers LED light sources, so as to measure the temperature of the LED light sources. The planar lighting apparatus further includes a second temperature sensor disposed outside of the first housing so as to measure the ambient temperature. Further, if needed, the planar lighting apparatus further includes a color sensor or an optical sensor disposed inside of the first housing so as to measure the light emitting characteristics of the LED light sources. Furthermore, planar lighting apparatus includes a computing section which calculates temperatures of the divided regions appropriately, on the basis of the measurement value of the first temperature sensor and the measurement value of the second temperature sensor (or, the measurement value of the first temperature sensor, that of the second temperature sensor, and that of the color sensor or the optical sensor) and setup information which has been prepared and memorized in advance. The computing section further corrects a driving condition of each of the light-source drive sections which drive the LED light sources, on the basis of the calculated temperatures of the divided regions.

Specifically, for example, a planar lighting apparatus 1 for lighting a liquid crystal panel 5 as illustrated in FIG. 1 has the following constitution. The planar lighting apparatus 1 includes a backlight source 7 which includes a first housing 7a which covers plural light emitting diodes (LEDs) with single color or multiple colors to form a light emitting surface (a surface of an optical sheet 6) shaped in a flat surface or a curved surface. The planar lighting apparatus 1 further includes a second housing 8 which covers the backlight light source 7, a light-source drive circuit 10 which includes plural light-source drive sections configured to individually drive and control plural light emitting regions formed by dividing the backlight light source 7 (the light emitting surface), respectively. The planar lighting apparatus 1 further includes a computing section 11 configured to calculate a driving condition of each of the light-source drive sections; and a memory section 12 configured to memorize setup information. There is provided at least one first temperature sensor 17 disposed inside of the first housing 7a, and at least one second temperature sensor 18 disposed outside of the first housing 7a and inside of the second housing 8. There is further provided at least one color sensor (or optical sensor) 16 disposed inside of the first housing 7a. The computing section 11 is configured to correct the driving condition of each of the light-source drive sections on the basis of a measurement value of the first temperature sensor 17, a measurement value of the second temperature sensor 18, a measurement value of the color sensor (or optical sensor) 16, and the setup information memorized in the memory section 12.

Figure 13A:
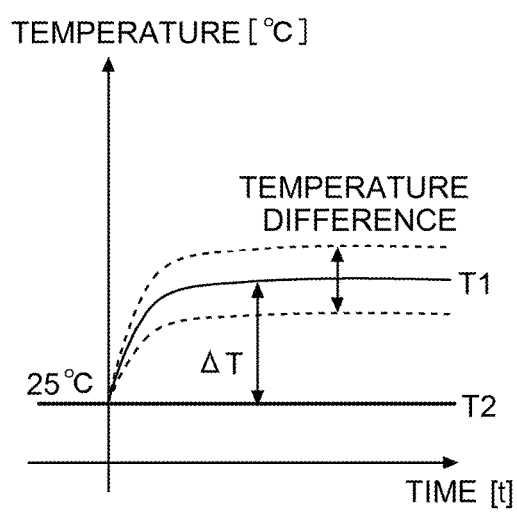
FIGS. 13A and 13B each is a graph illustrating temperature transition after lighting of the backlight source according to the first example.
Figure 13B:
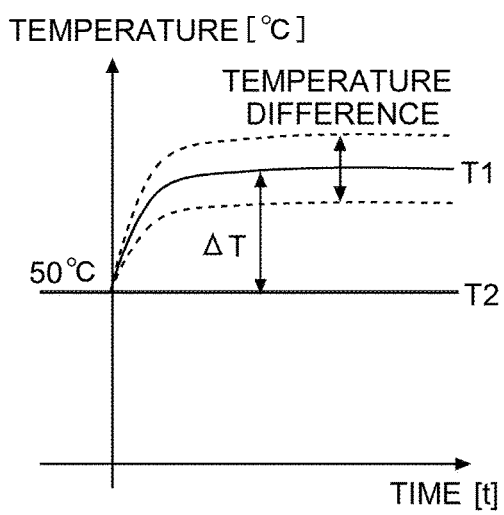

The correcting process of the driving conditions is described by using FIGS. 13A and 13B. FIG. 13A is a graph illustrating a temperature transition after lighting of the backlight source (starting at 25° C. ambient temperature), and FIG. 13B is another graph illustrating after the lighting of the backlight source (starting at 50° C. ambient temperature). As illustrated in FIGS. 13A and 13B, continuous operation of the backlight source 7 in the lighting condition causes the self-heat generation of the light emitting elements, which increases the inner temperature of the first housing 7a in comparison with the ambient temperature and makes a temperature difference within a plane where the LEDs are mounted. In view of that, in order to correct the temperature rise in the backlight source 7 and the temperature difference, the computing section 11 obtains the sum (T1) of the ambient temperature of the backlight source 7 and the representative value of temperature changes taking place inside of the first housing 7a due to the self-heat generation of the backlight source 7 measured with the first temperature sensor 17; and obtains the ambient temperature (T2) of the backlight source 7 measured with the second temperature sensor 18. The computing section 11 calculates a representative value ($\Delta T$) of the temperature changes taking place inside of the first housing 7a due to the self-heat generation of the backlight source 7, on the basis of a difference between the measurement value (T1) of the first temperature sensor 17 and the measurement value (T2) of the second temperature sensor 18. The computing section 11 further calculates an in-plane temperature distribution ($T_{(m, n)}$) at the inside of the first housing 7a, on the basis of the calculated representative value ($\Delta T$) of the temperature changes; and corrects the influence of a characteristic change of the light emitting elements coming from the temperature and a characteristic change of a color sensor coming from the temperature, on the basis of the calculated in-plane temperature distribution ($T_{(m, n)}$), for each of the divided light emitting regions of the backlight source 7.

With the above-described elements configuration and the control condition, even when the ambient temperature of the liquid crystal display apparatus has changed, it is possible to keep the backlight source of the liquid crystal display apparatus in an intended lighting condition on the basis of the generation process of the internal temperature distribution in the backlight source of the liquid crystal display apparatus.

Further, with the above-described elements configuration and the control condition, even when a power consumption applied to a backlight source has changed and then an amount of self-heat generation has changed, for example, the condition that the set luminance of a liquid crystal display apparatus has changed, it is possible to keep the backlight source of the liquid crystal display apparatus in an intended lighting condition on the basis of the generation process of a temperature distribution at the inside of the backlight source of the liquid crystal display apparatus.

Furthermore, with the above-described elements configuration and the control condition, it is possible to perform the control of the luminance unevenness (ununiformity of luminance within the backlight surface) and color unevenness (ununiformity of chromaticity within the backlight surface) which take place on a backlight source of a liquid crystal display apparatus, and of a temperature distribution taking place at the inside of the backlight source, with a small number of temperature sensors and color sensors; and is possible to reduce the cost of expensive optical sensor components greatly.

Furthermore, the above-described elements configuration and the control condition can be realized with a small number of temperature sensors and color sensors. Accordingly, in the case where an IC is used for the computing section, the number of pins can be reduced, and the scale of calculation is also reduced. Similarly, the cost of expensive optical sensor components can be reduced greatly.

Furthermore, with the constitution such that at least one second temperature sensor is disposed outside of the first housing and at the inside of the second housing, the planar lighting apparatus can maintain a stable light emitting state without the influence of the outside air temperature which can make a rapid change due to the environment or a working condition.

EXAMPLE 1

In order to describe still in detail about the above-mentioned embodiment of the present invention, description will be given to a planar lighting apparatus and a liquid crystal display apparatus according to the first example with reference to FIGS. 1 to 19D.

FIG. 1 illustrates a first example in which a planar lighting apparatus as one embodiment of the present invention is applied to a liquid crystal display apparatus. As illustrated in FIG. 1, the liquid crystal display apparatus 1 of this example includes a liquid crystal panel 5; a planar light source (a backlight source 7 in this example); and a second housing 8 which covers the backlight source 7. The planar light source includes a first housing 7a which covers plural light emitting elements with single color or multiple colors to form a light emitting surface shaped in a flat surface or a curved surface (on the optical sheet 6), where the light emitting surface is divided into plural light emitting regions. Here, the backlight source 7 and the second housing 8 form a part of the planar lighting apparatus (the plane-type lighting system) of the present example. The planar lighting apparatus further includes a light-source drive circuit 10, a computing section 11, and a memory section 12 adapted to memorize setup information. The light-source drive circuit 10 includes plural light-source drive sections each adapted to drive and control light emitting elements belonging to the corresponding divided light emitting regions. The computing section 11 is adapted to calculate a driving condition of each of the plural light-source drive sections. Further, the planar lighting apparatus further includes at least one color sensor 16 disposed inside of the first housing 7a of the backlight source 7, at least one first temperature sensor 17 disposed inside of the first housing 7a, and at least one second temperature sensor 18 disposed outside of the first housing 7a and inside of the second housing 8. The computing section 11 is configured to correct the driving condition of each of the plural light-source drive sections on the basis of at least the measurement value of the color sensor 16 measured by a color detecting section 13, the measurement value of the first temperature sensor 17 measured by a temperature detecting section 14, the measurement value of the second temperature sensor 18 measured by a temperature detecting section 15, and the setup information in the memory section 12.

Figure 2:
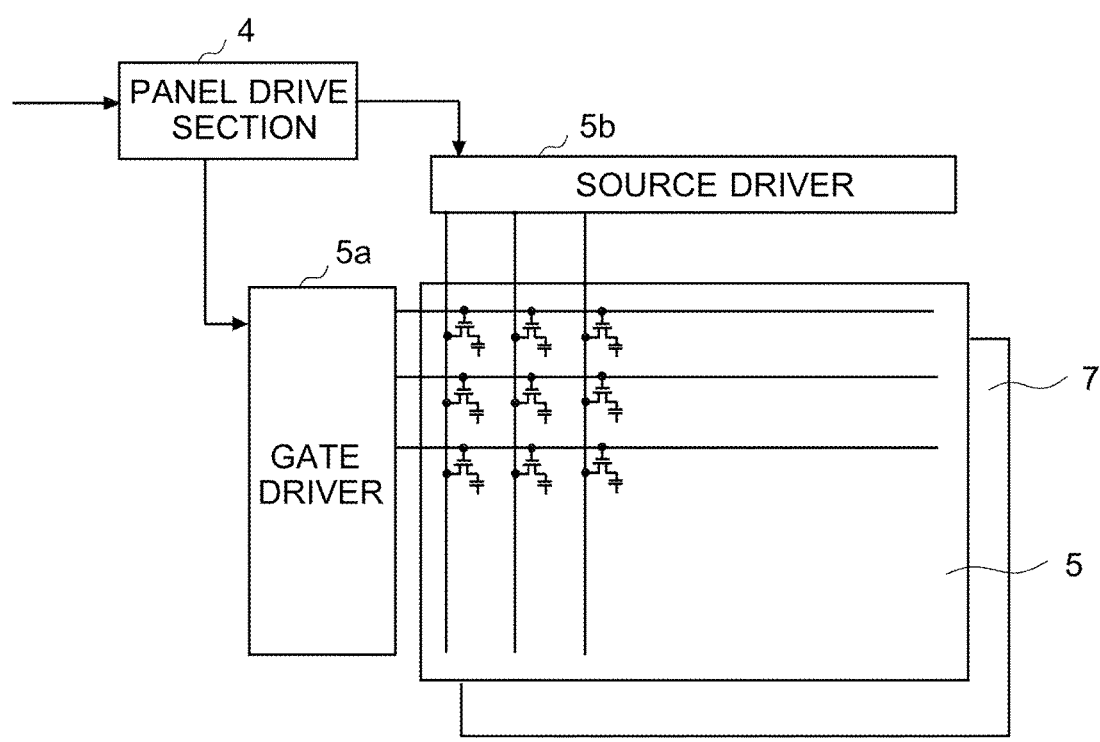
FIG. 2 is a diagram schematically illustrating a constitution of a liquid crystal panel unit according to the first example.

FIG. 2 illustrates an example of a constitution of a liquid crystal panel unit applied to the liquid crystal display apparatus of the present example. As illustrated in FIG. 2, the liquid crystal panel unit includes a panel drive section 4, a gate driver 5a, a source driver 5b, a liquid crystal panel 5, etc. The panel drive section 4 is adapted to generate and output signals to control the gate driver 5a and the source driver 5b on the basis of image input signals processed by an image processing section 2. The gate driver 5a is adapted to scan gates of driving transistors in each row of pixels in the vertical direction via the address lines of the liquid crystal panel 5 in response to a signal from the panel drive section 4. The source driver 5b is adapted to supply a voltage corresponding to an image input signal to sources of driving transistors of each column of the pixels via data lines in response to a signal from the panel drive section 4. The liquid crystal panel 5 is configured to supply a voltage corresponding to an image input signal to a pixel connected to a driving transistor arranged at each intersection between the address lines and the data lines in response to scanning in the vertical direction, thereby performing image display corresponding to the input signal.

Figure 3A:
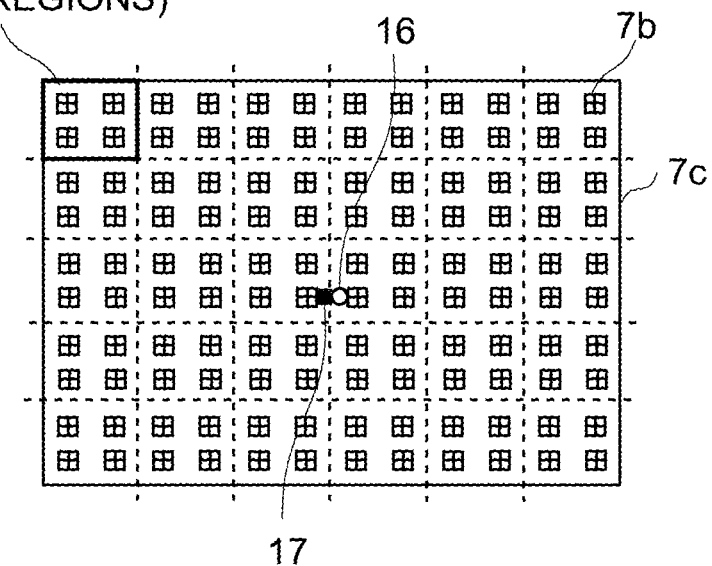
FIGS. 3A and 3B are diagrams illustrating an example of a constitution of a backlight source according to the first example.
Figure 3B:
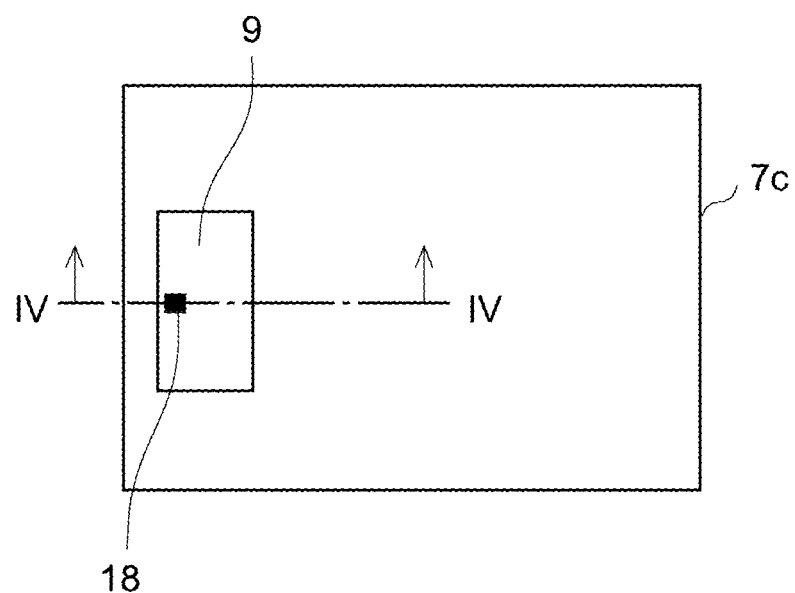

FIG. 3A is a diagram illustrating an LED mounting board in the first housing 7a of the backlight source 7 of this example, which is viewed from the front surface side, and FIG. 3B is a diagram illustrating the LED mounting board, which is viewed from the back surface side. As illustrated in FIG. 3A, LED light sources are used as light emitting elements in this example. On the LED mounting board 7c mounted inside the backlight source 7, a large number of LED light sources are arranged, where each LED light source is a set of LEDs with multiple colors (hereafter, referred to as a LED cluster 7b) composed of three color LEDs such as a R-LED, a G-LED and a B-LED. The LED mounting board 7c is divided into M×N regions (where M and N each is a positive integer, and at least one of them is a positive integer of two or more) so as to form plural divided light emitting regions. A large number of LED clusters 7b arranged on the LED mounting board 7c are operated such that the LED clusters 7b in the divided light emitting regions separately emit light. Each of the divided light emitting regions is driven and controlled individually by the light-source drive circuit 10 including the above-mentioned plural light-source drive sections. Although this example is constituted to use LEDs with three colors of RGB, white LEDs may be added to the LEDs with three colors of RGB, or LEDs with YMC colors may be used. Further, at the almost center of the LED mounting board 7c mounted inside the backlight source 7, one color sensor 16 and one first temperature sensor 17 are arranged. As the color sensor 16, it may be possible to use a common optical sensor capable of separately measuring a light flux having a different peak wavelength and different spectral components of light, such as a light flux in each of RGB colors.

On the other hand, as illustrated in FIG. 3B, on the rear surface of the LED mounting board 7c of this example, an LED drive board 9 is arranged. On the LED drive board 9, the above-mentioned light-source drive circuit 10, the computing section 11, the memory section 12, the color detecting section 13, the temperature detecting sections 14 and 15, etc. are mounted. Further, on the LED drive board 9, the second temperature sensor 18 is disposed.

In this example, although one color sensor 16 and one first temperature sensor 17 are arranged at the almost center of the LED mounting board 7c, these sensors may be provided in an arbitrary manner as far as they are covered within the first housing 7a of the backlight source 7, and their arranged-positions and the number of them may be changed appropriately. Further, in FIG. 3A, although the color sensor 16 and the first temperature sensor 17 are arranged close to each other, they may be arranged separately from each other. Furthermore, although the second temperature sensor 18 is arranged on the LED drive board 9 in FIG. 3B, the second temperature sensor 18 may be provided in an arbitrary manner as far as it locates at the outside of the first housing 7a of the backlight source 7 and at the inside of the second housing 8, and its arranged-position and the number of it may be changed appropriately. Moreover, as each of the first temperature sensor 17 and the second temperature sensor 18, it may be possible to use common temperature sensors, such as a resistance temperature detector and a thermocouple. The respective types of them may be the same with each other or may be changed in accordance with the range of temperature to be measured and the required accuracy of measured temperature.

Figure 4A:
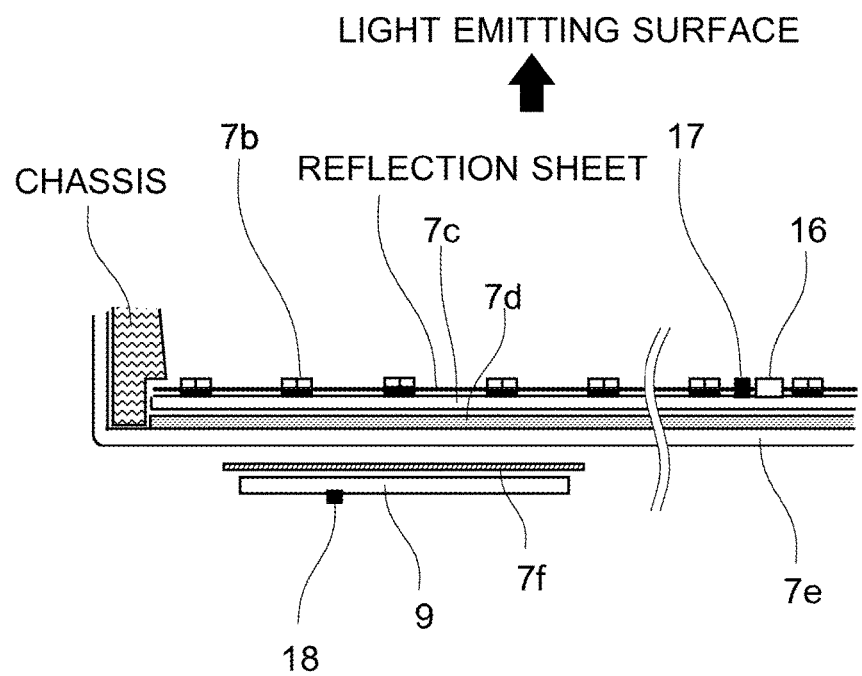
FIGS. 4A and 4B each is a diagram illustrating an example of a structure of the backlight source according to the first example, and is a cross sectional view taken along IV-IV line in FIG. 3B.
Figure 4B:
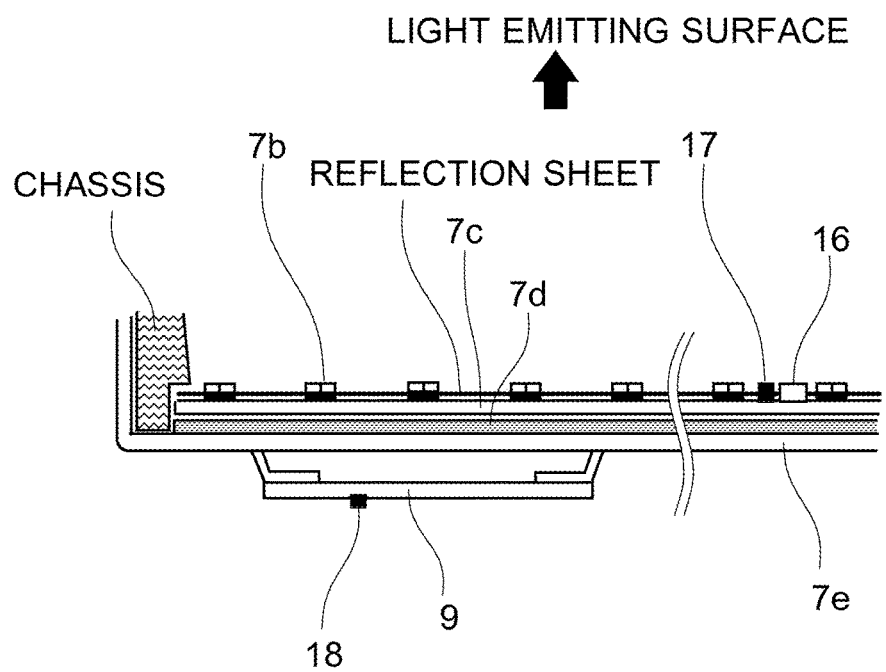

Each of FIGS. 4A and 4B illustrates a cross sectional view of the backlight source 7 of this example. That is, each of FIGS. 4A and 4B illustrates a cross section taken along the IV-IV line in the above-mentioned FIG. 3B. As illustrated in FIG. 4A, the first temperature sensor 17, the color sensor 16, an a large number of LED clusters 7b are arranged together on the LED mounting board 7c, where the LED mounting board 7c is arranged inside of the first housing 7a (which is formed by the chassis and the backlight source rear board 7e in FIG. 4A, and optical sheet 6 in FIG. 1) of the backlight source land on the surface at the light emitting surface side of the first housing 7a. The LED mounting board 7c is disposed on the backlight source rear board 7e (on the first housing 7a) with a heat conductive sheet 7d put between the LED mounting board 7c and the backlight source rear board 7e. On the other hand, the second temperature sensor 18 is installed on the LED drive substrate 9 arranged at the outside of the first housing 7a, where the LED drive substrate 9 is disposed on the backlight source rear board 7e (on the rear surface of the first housing 7a) with a thermal insulating sheet 7f, such as a resin sheet with low thermal conductivity, put between the LED drive substrate 9 and the backlight source rear board 7e.

In this way, the first temperature sensor 17 is disposed inside of the first housing 7a, and constituted to be able to measure the temperature at the inner side of the backlight source 7. On the other hand, the second temperature sensor 18 is disposed outside side of the first housing 7a and inside of the second housing 8, and constituted to be not likely to be influenced by the inner temperature of the first housing 7a and to be not likely to be influenced by the outside air temperature.

In this example, in order to reduce the increase of the self-heat generation of the LED clusters 7b, the first temperature sensor 17 is provided so as to secure a heat releasing passage to the backlight source rear board 7e through the heat conductive sheet 7d. However, as long as the first temperature sensor 17 is disposed inside of the first housing 7a, there is no necessary to provide the first temperature sensor 17 so as to secure the passage through the heat conductive sheet 7d. Further, the second temperature sensor 18 is arranged on the LED drive board 9 via the heat insulating sheet 7f, such as a resin sheet with low thermal conductivity. However, as long as the second temperature sensor 18 is disposed outside of the first housing 7a and inside of the second housing 8, there is no necessary to provide the second temperature sensor 18 together with the thermal insulating sheet 7f, such as a resin sheet with low thermal conductivity.

As illustrated in FIG. 4B, the backlight source rear board 7e may include a bent portion on which the LED drive board 9 is fixed such that the whole surface does not come in contact with the backlight source rear board 7e, and the second temperature sensor 18 may be arranged on such the LED drive board 9. Also in this constitution, the second temperature sensor 18 is disposed outside of the first housing 7a and inside of the second housing 8, and constituted to be not likely to be influenced by the inner temperature of the first housing 7a and to be not likely to be influenced by the outside air temperature, which is one of preferable embodiments. Furthermore, although the second temperature sensor 18 is arranged on the LED drive board 9, the second temperature sensor 18 may be installed on a base board prepared independently from the LED drive board 9.

Hereafter, description is given to the temperature characteristics of LEDs serving as light emitting elements of the present example and the temperature changes at various portions on the LED mounting board 7c of the planar lighting apparatus.

Figure 5:
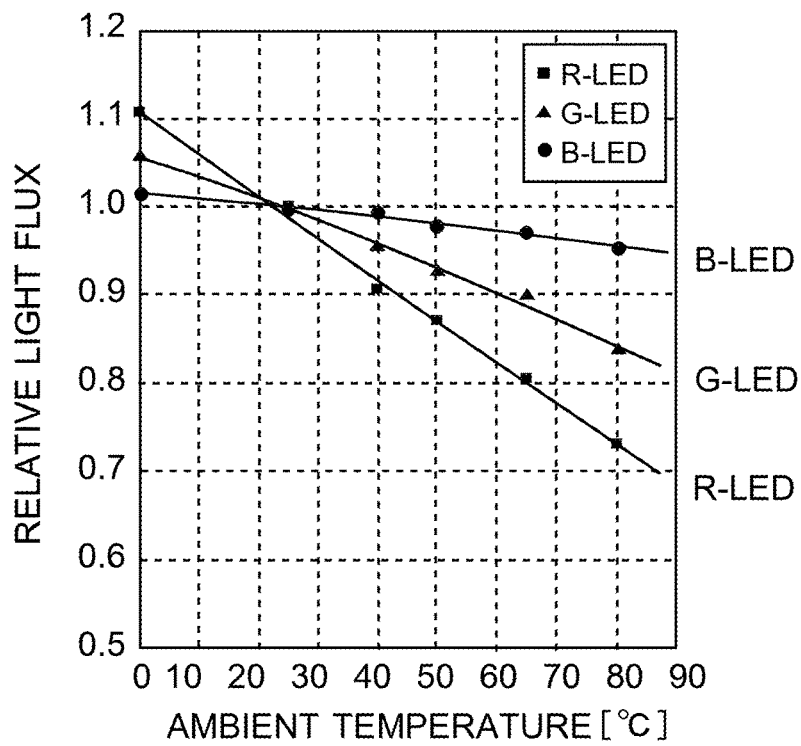
FIG. 5 is a graph illustrating the temperature characteristic of each of a R-LED, G-LED, and B-LED.
Figure 6:
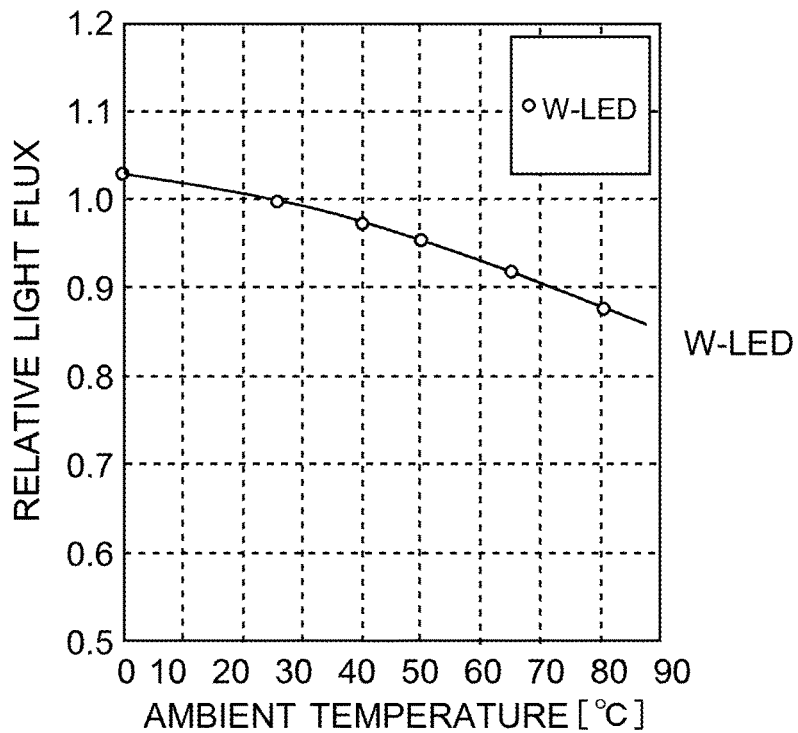
FIG. 6 is a graph illustrating the temperature characteristic of a white LED.

FIG. 5 illustrates the temperature characteristic of each of a R-LED, a G-LED, and a B-LED, and FIG. 6 illustrates the temperature characteristic of a white LED. As shown in FIGS. 5 and 6, each of the R-LED, G-LED, B-LED and white LED has a characteristic that the light emitting state greatly changes depending on a temperature condition and the light flux decays when the temperature becomes high. The R-LED, G-LED, B-LED of this example have different characteristics of the decay of the emission light, which causes a color change of the backlight source 7 together with a luminance change depending on temperature conditions. Since this change occurs due to not only a temperature increase of the whole body of the backlight source 7, but also due to the in-plane temperature difference inside of the backlight source 7, it is necessary to perform the drive and control of the LEDs in accordance with the in-plane temperature difference.

Figure 7A:
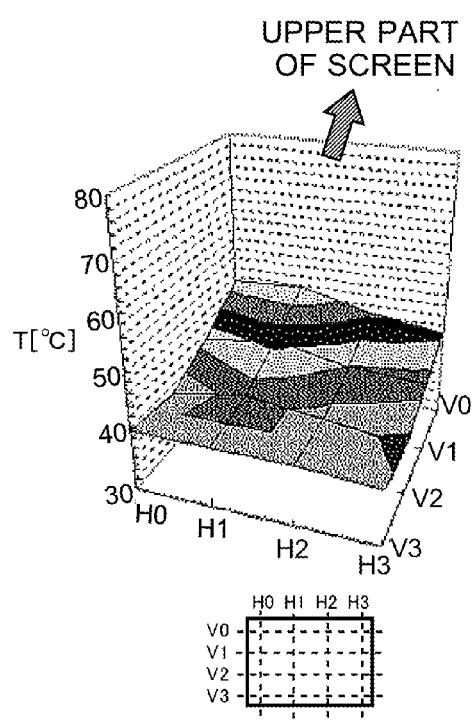
FIGS. 7A and 7B each is a graph illustrating temperatures on divided light emitting regions of the planar lighting apparatus according to the first example.
Figure 7B:
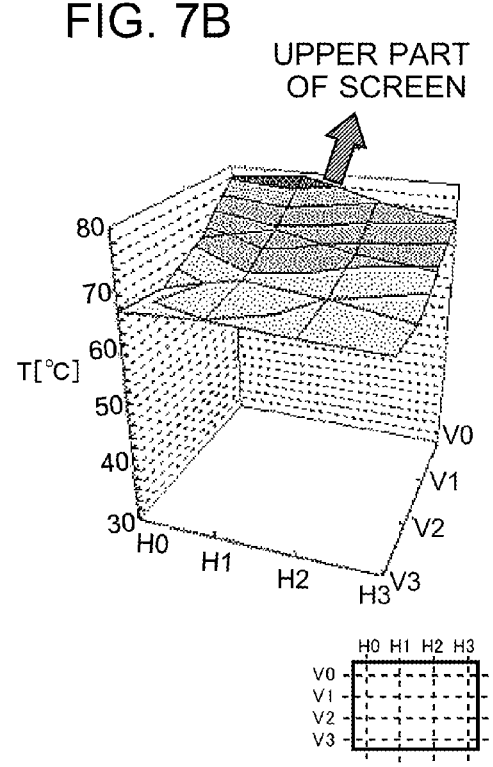

In the liquid crystal display apparatus of this example, the LED mounting board 7c arranged in the first housing 7a of the backlight source 7 is divided into M×N light emitting regions, and a position of each of the M×N regions is specified with m (0≤m<M) and n (0≤n<N) (hereafter, the position is referred to as each portion of the divided light emitting regions in the first housing 7a). Each of FIGS. 7A and 7B illustrates the temperature ($T_{(m, n)}$) on each portion of the divided light emitting regions (represented by H0 to H3 and V0 to V3 in the graphs) in a temperature-saturated state in the case where a white luminance is 400 cd/m². FIG. 7A shows the case of 25° C. ambient temperature, and FIG. 7B shows the case of 50° C. ambient temperature. As can be seen from FIGS. 7A and 7B, in the backlight source 7 of the present example, if the lighting is continued, the inner temperature of the first housing 7a of the backlight source 7 rises due to the self-heat generation of the LEDs and becomes thermal equilibrium at a temperature higher than the ambient temperature, and in the thermal equilibrium state, an in-plane temperature difference occurs.

Figure 8A:
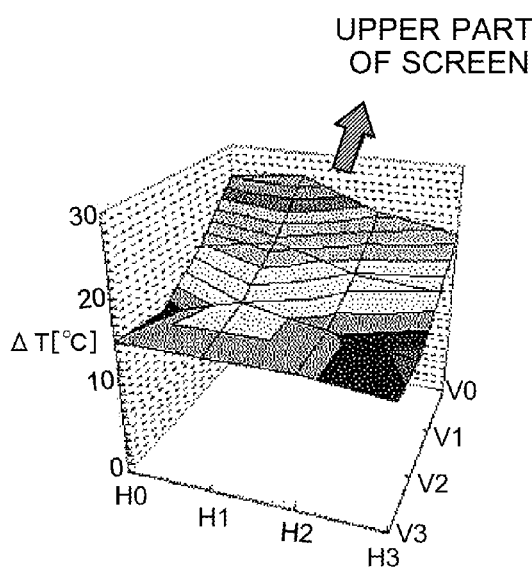
FIGS. 8A and 8B each is a graph illustrating temperature changes on divided light emitting regions of the planar lighting apparatus according to the first example.
Figure 8B:
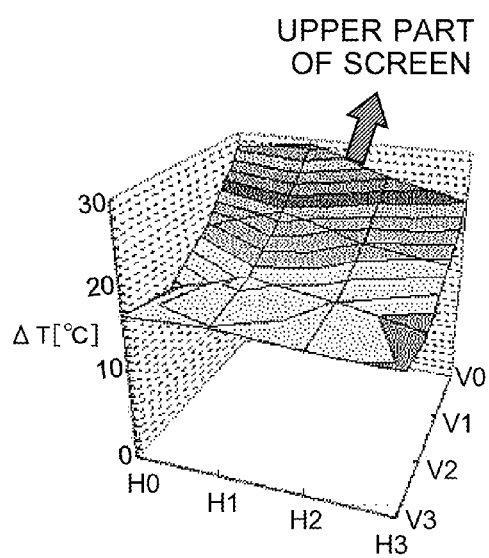

Each of FIGS. 8A and 8B illustrates temperature change ($\Delta T_{(m, n)}$) from the ambient temperature on each portion of the divided light emitting regions in the first housing 7a of the backlight source 7 in a temperature-saturated state in the case where a white luminance is 400 cd/m², in the liquid crystal display apparatus of this example. FIG. 8A shows the case of 25° C. ambient temperature, and FIG. 8B shows the case of 50° C. ambient temperature. As can be seen from FIGS. 8A and 8B, the temperature change ($\Delta T_{(m, n)}$) from the ambient temperature on each portion of the divided light emitting regions in a thermal equilibrium state becomes the similar figure irrespective of the ambient temperature. Comparing the case of 25° C. ambient temperature with the case of 50° C. ambient temperature, as the ambient temperature becomes high, a quantity of light fluxes of an LED deceases relatively, which increases the power consumption to be applied to the LED in order to maintain the same white luminance. However, the self-heat generation of the LEDs increases with corresponding to the increasing rate of the power consumption. It results in an increase of a temperature change inside of the first housing 7a in whole. Concretely, in the case where an ambient temperature is 25° C., the representative value of temperature changes at the inside of the housing is 21.6° C. On the other hand, in the case where an ambient temperature is 50° C., the representative value increases to 23.7° C. Further, it also results in an increased in-plane temperature difference. In the case where an ambient temperature is 25° C., the in-plane temperature difference is 12.6° C. On the other hand, in the case where an ambient temperature is 50° C., it becomes 13.6° C.

Figure 9A:
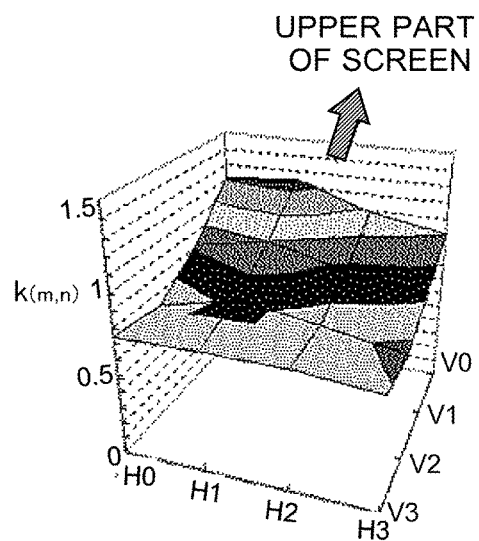
FIGS. 9A and 9B each is a graph illustrating temperature change coefficients of divided light emitting regions of the planar lighting apparatus according to the first example.
Figure 9B:
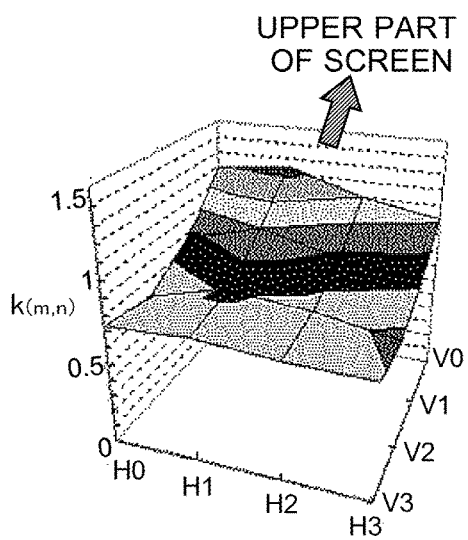

Next, each of FIGS. 9A and 9B illustrates a temperature change coefficient ($k_{(m, n)}$) on each portion of the divided light emitting regions in the first housing 7a of the backlight source 7 in a temperature-saturated state in the case where a white luminance is 400 cd/m², in the liquid crystal display apparatus of this example. FIG. 9A shows the case of 25° C. ambient temperature, and FIG. 9B shows the case of 50° C. ambient temperature. The temperature change coefficient ($k_{(m, n)}$) is calculated by the following expression 1 under the assumption that the temperature at the position (H1, V1) in FIGS. 9A and 9B is the representative value of temperature changes inside of the first housing 7a.

$$k_{(m, n)} = \Delta T_{(m, n)} / \Delta T \quad (1)$$

In the expression, $k_{(m, n)}$ is a temperature change coefficient of each portion of the divided light emitting regions at the inside of the first housing, $\Delta T_{(m, n)}$ is a temperature change of each portion of the divided light emitting regions at the inside of the first housing, and $\Delta T$ is a representative value of temperature changes at the inside of the first housing, where m and n are integers satisfying 0≤m<M and 0≤n<N and represent a position inside the first housing, and M and N represent the number of divided light emitting regions at the inside of the first housing.

As illustrated in FIGS. 9A and 9B, the temperature change coefficient ($k_{(m, n)}$) from the ambient temperature of each portion of the divided light emitting regions in a thermal equilibrium state almost coincides irrespective of the ambient temperature. Further, as mentioned in the above, as the ambient temperature becomes high, a quantity of light fluxes of an LED deceases, which increases the power consumption to be applied to the LED in order to maintain the same white luminance. However, the temperature change coefficient ($k_{(m, n)}$) almost coincides without depending on a difference in the power consumption to be applied to the LED.

Figure 10A:
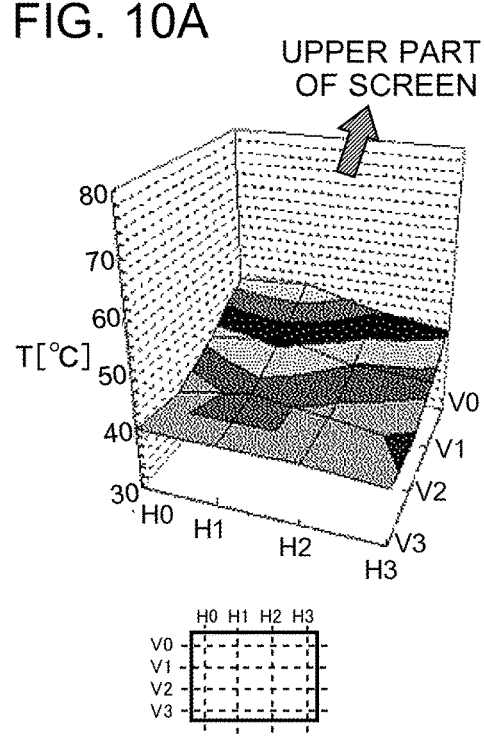
FIGS. 10A and 10B each is a graph illustrating temperatures on divided light emitting regions of the planar lighting apparatus according to the first example.
Figure 10B:
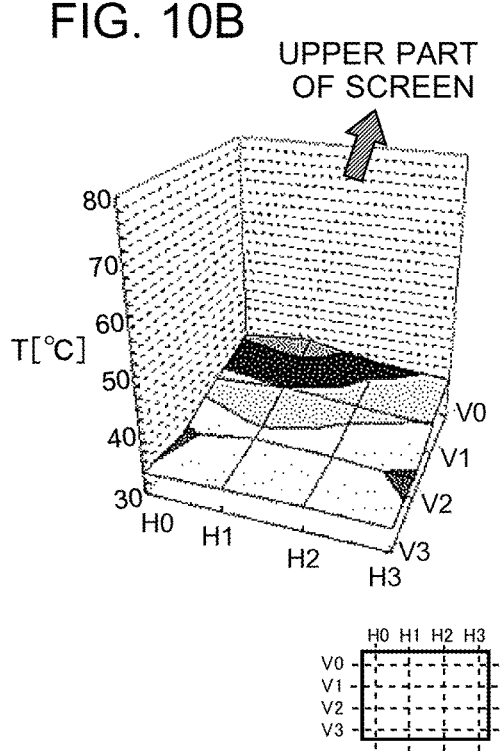
Figure 11A:
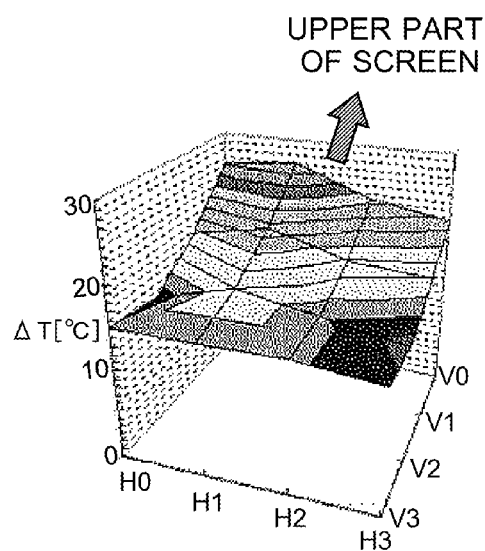
FIGS. 11A and 11B each is a graph illustrating temperature changes on divided light emitting regions of the planar lighting apparatus according to the first example.
Figure 11B:
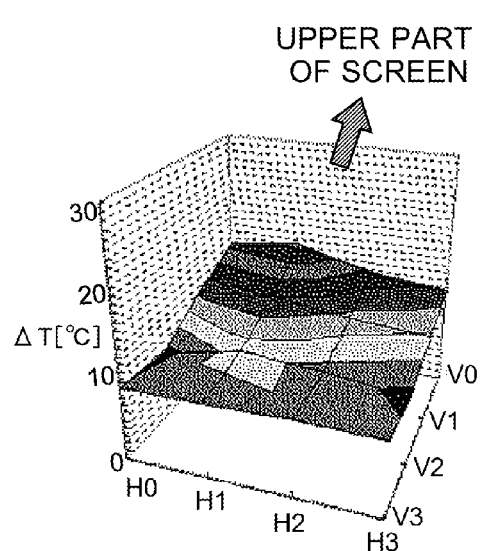

Each of FIGS. 10A and 10B illustrates the temperature ($T_{(m, n)}$) on each portion of the divided light emitting regions in the first housing 7a of the backlight source 7 in a temperature-saturated state in the case where a ambient temperature is 25° C., in the liquid crystal display apparatus of this example. FIG. 10A is in the case where a white luminance in the liquid crystal display apparatus of this example is 400 cd/m², and FIG. 10B is in the case where a white luminance is 250 cd/m². Each of FIGS. 11A and 11B shows a temperature change ($\Delta T_{(m, n)}$) from the ambient temperature on each portion of the divided light emitting regions in the first housing 7a of the backlight source 7 in a temperature-saturated state in the case where a ambient temperature is 25° C. in the liquid crystal display apparatus of this example. FIG. 11A is in the case where a white luminance in the liquid crystal display apparatus of this example is 400 cd/m², and FIG. 11B is in the case where a white luminance is 250 cd/m². As can be seen from these graphs, in the case where the ambient temperature is the same and the white luminance in the liquid crystal display is different, as the white luminance becomes small, the power consumption to be applied to the LED becomes small. Accordingly, the self-heat generation of the LEDs decreases in proportion to the decreasing rate of the power consumption, a temperature change at the inside of the first housing decreases on the whole, and an in-plane temperature difference also becomes small. In FIGS. 11A and 11B, the representative value of temperature changes at the inside of the housing is 21.6° C. and the in-plane temperature difference is 12.6° C. in the case where a white luminance is 400 cd/m²; and the representative value decreases to 13.0° C., and the in-plane temperature difference is 7.6° C., in the case where a white luminance is 250 cd/m².

Figure 12A:
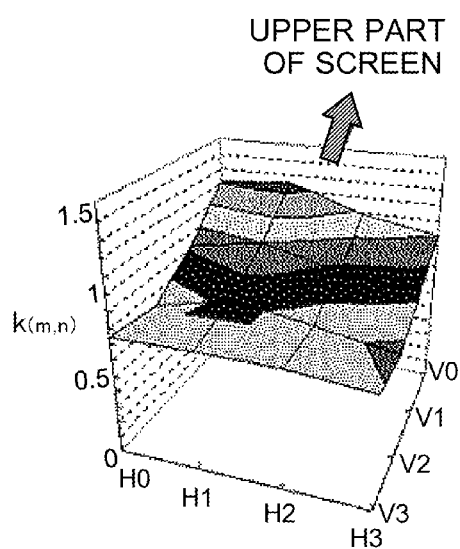
FIGS. 12A and 12B each is a graph illustrating temperature change coefficients of divided light emitting regions of the planar lighting apparatus according to the first example.
Figure 12B:
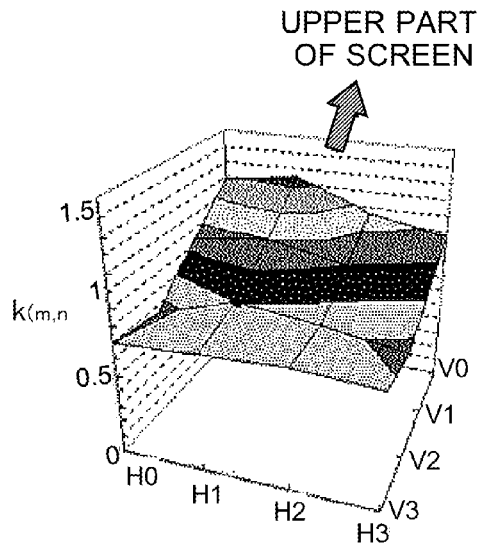

Further, each of FIGS. 12A and 12B illustrates the temperature change coefficient ($k_{(m, n)}$) on each portion of the divided light emitting regions in the first housing 7a of the backlight source 7 in a temperature-saturated state in the case where a ambient temperature is 25° C. in the liquid crystal display apparatus of this example. FIG. 12A is in the case where a white luminance is 400 cd/m², and FIG. 12B is in the case where a white luminance is 250 cd/m². As can be seen from FIGS. 12A and 12B, the temperature change coefficient ($k_{(m, n)}$) of each portion of the divided light emitting regions in a thermal equilibrium state almost coincides irrespective of the white luminance of the liquid crystal display apparatus and almost coincides without depending on a difference in the power consumption to be applied to the LEDs.

Here, an arbitrary ambient temperature may be used as long as it is an ambient temperature measured around the backlight source 7 composed of the first housing 7a which covers the plural light emitting elements. In the present example, since a temperature at the inner side of the liquid crystal display apparatus and around the backlight source 7 is defined as the ambient temperature, it is possible to measure the ambient temperature of the backlight source stably without the influence of the outside air temperature which may change rapidly depending on the surrounding environment and the used condition of the liquid crystal display apparatus.

Hereafter, a control method for the backlight source 7 of this example is described.

FIGS. 13A and 13B show a temperature inside of the liquid crystal display apparatus 1 and around the backlight source 7, a temperature rise at the inside of the first housing 7a of the backlight source 7 due to the self-heat generation, an in-plane temperature difference at the inside of the first housing 7a, the measurement value (T1) of the first temperature sensor 17 and the measurement value (T2) of the second temperature sensor 18 of the present example.

As mentioned above, the backlight source 7 of the present example raises its temperature due to the self-heat generation after the lighting, and becomes a thermal equilibrium state. Then, in the saturated state of having reached the thermal equilibrium state, the backlight source 7 causes the almost similar temperature rise and an in-plane temperature difference without depending on the ambient temperature. In order to control the backlight source 7 appropriately in consideration of the temperature rise and the in-plane temperature difference, in this example, as mentioned above, the first temperature sensor 17 disposed at the inside of the first housing 7a measures the sum (T1) of the ambient temperature of the backlight source 7 and the representative value of temperature changes caused at the inside of the first housing 7a due to the self-heat generation of the backlight source 7, and the second temperature sensor 18 disposed at the outside of the first housing 7a measures the ambient temperature (T2) of the backlight source 7. Then, the computing section 11 performs the following processing.

Figure 14B:
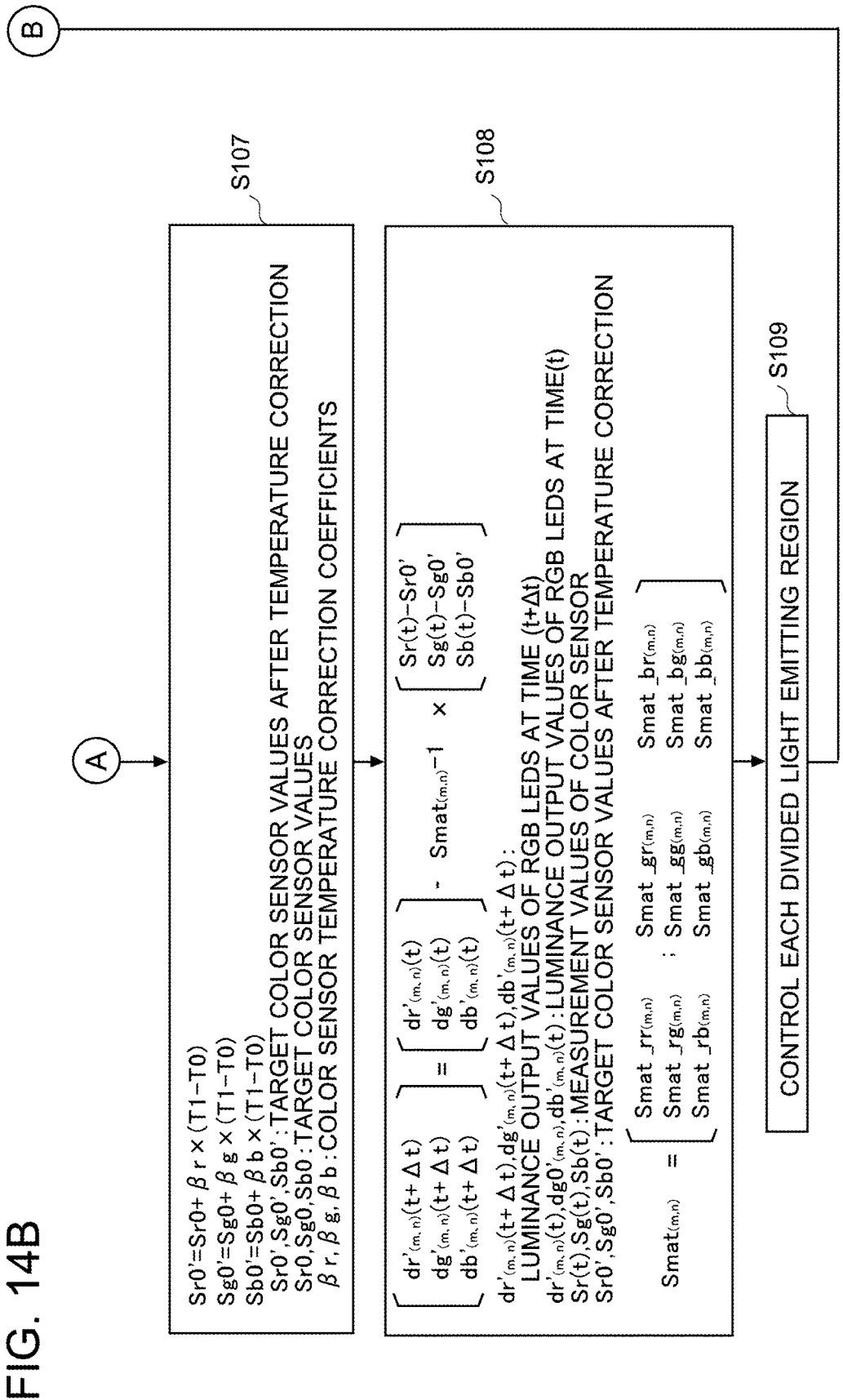

FIGS. 14A and 14B illustrate a flowchart of the processing of the computing section 11 of the present example.

As illustrated in FIGS. 14A and 14B, the computing section 11 reads data (setup information) memorized in the memory section 12 (S101). Next, the computing section 11 acquires the measurement value of the color sensor 16 from the color detecting section 13, the measurement value of the first temperature sensor 17 from the temperature detecting section 14, and the measurement value of the second temperature sensor 18 from the temperature detecting section 15 (S102).

Next, the computing section 11 calculates a representative value (ΔT) of temperature changes inside of the first housing 7a due to the self-heat generation of the backlight source 7, on the basis of a difference between the measurement value (T1) of the first temperature sensor 17 and the measurement value (T2) of the second temperature sensor 18, by using the expression 2 (S103).

$$\Delta T = T1 - T2 \tag{2}$$

In the expression 2, ΔT is a representative value of temperature changes inside of the first housing, T1 is the measurement value of the first temperature sensor, and T2 is the measurement value of the second temperature sensor.

Next, the computing section 11 calculates a temperature change $(\Delta T_{(m, n)})$ on each portion of the divided light emitting regions, on the basis of the calculated representative value (ΔT) of temperature changes caused inside of the first housing 7a due to the self-heat generation of the backlight source 7 and of a temperature change coefficient $(k_{(m, n)})$ on the corresponding portion of the divided light emitting regions, by using the following expression 3 (S104). The temperature change coefficient $(k_{(m, n)})$ is a ratio of a temperature change on each portion of the divided light emitting regions of the backlight source 7 to a representative value (ΔT) of temperature changes inside of the first housing 7a, which are calculated using the measurement values of the first temperature sensor 17 and the measurement values of the second temperature sensor 18 which have been measured in advance.

$$\Delta T_{(m, n)} = k_{(m, n)} \times \Delta T \tag{3}$$

In the expression 3, $\Delta T_{(m, n)}$ is a temperature change on each portion of the divided light emitting regions, $k_{(m, n)}$ is a temperature change coefficient of each portion of the divided light emitting regions, where m and n are integers satisfying 0≤m<M and 0≤n<N, and M and N represent the number of divided light emitting regions at the inside of the first housing.

Then, the computing section 11 calculates a temperature $(T_{(m, n)})$ on each portion of the divided light emitting regions from the calculated temperature change $(\Delta T_{(m, n)})$ on each portion of the divided light emitting regions by the following expression 4 (S 105).

$$T_{(m, n)} = T2 + \Delta T_{(m, n)} \tag{4}$$

In the expression 4, $T_{(m, n)}$ is a temperature on each portion of the divided light emitting regions, where m and n are integers satisfying 0≤m<M and 0≤n<N, and M and N represent the number of divided light emitting regions at the inside of the first housing.

With the above, the temperature $(T_{(m, n)})$ on each portion of the divided light emitting regions can be calculated without being influenced by the ambient temperature of the backlight source.

Next, shown is an example of a method of correcting the luminance on a divided light emitting region inside of the housing of this example by using the above temperature change $(\Delta T_{(m, n)})$ on each portion of the divided light emitting regions and the measurement value of the color sensor 16.

In the memory section 12 in FIG. 1, there have been recorded beforehand the ambient temperature (T0) at the time of calculating the temperature change coefficient $(k_{(m, n)})$ of each portion of the divided light emitting regions based on the preliminarily-measured measurement value of each of the first temperature sensor 17 and the second temperature sensor 18; the luminance output values $(dr0_{(m, n)}, dg0_{(m, n)}, db0_{(m, n)})$ of the R-LEDs, G-LEDs, and B-LEDs on each of the divided light emitting regions at that time; and the temperature correction coefficients $(\alpha r_{(m, n)}, \alpha g_{(m, n)}, \alpha b_{(m, n)})$ of the luminance values of the R-LEDs, G-LEDs, and B-LEDs for each of the divided light emitting regions calculated on the basis of the preliminarily-measured measurement values of the color sensor 16. Those are sent to the computing section 11.

The computing section 11 calculates the temperature-corrected luminance output values $(dr'_{(m, n)}, dg'_{(m, n)}, db'_{(m, n)})$ of the R-LEDs, G-LEDs, and B-LEDs on each of the divided light emitting regions, on the basis of the temperature $(T_{(m, n)})$ of each portion of the divided light emitting regions, by using the following expressions (S106).

$$dr'_{(m, n)} = dr0_{(m, n)} + \alpha r_{(m, n)} \times (T_{(m, n)} - T0) \tag{5}$$

$$dg'_{(m, n)} = dg0_{(m, n)} + \alpha g_{(m, n)} \times (T_{(m, n)} - T0) \tag{6}$$

$$db'_{(m, n)} = db0_{(m, n)} + \alpha b_{(m, n)} \times (T_{(m, n)} - T0) \tag{7}$$

In the expressions 5 to 7, $dr'_{(m, n)}$, $dg'_{(m, n)}$ and $db'_{(m, n)}$ are the luminance output values of the R-LEDs, G-LEDs, and B-LEDs after the temperature correction, $dr0_{(m, n)}$, $dg0_{(m, n)}$ and $db0_{(m, n)}$ are the luminance output values of the R-LEDs, G-LEDs, and B-LEDs at the time of preliminary measurement, $\alpha r_{(m, n)}$, $\alpha g_{(m, n)}$, $\alpha b_{(m, n)}$ are the temperature correction coefficients for the luminance values of the R-LEDs, G-LEDs, and B-LEDs, and T0 is the ambient temperature at the time of preliminary measurement, where in and n are integers satisfying 0≤m<M and 0≤n<N and, M and N represent the number of divided light emitting regions at the inside of the first housing.

The calculated luminance output values ($dr'_{(m, n)}$, $dg'_{(m, n)}$ and $db'_{(m, n)}$) of the R-LEDs, G-LEDs, and B-LEDs on each of the divided light emitting regions after the temperature correction are sent to the light-source drive section installed for each of the divided light emitting regions of the backlight source 7. The light-source drive section is prepared for each of the divided light emitting regions of the backlight source 7 and each of RGB colors. Each of the light-source drive sections is configured to drive and control individually a corresponding one of the divided light emitting regions in accordance with the luminance output values ($dr'_{(m, n)}$, $dg'^{(m, n)}$ and $db'_{(m, n)}$) of the R-LEDs, G-LEDs, and B-LEDs after temperature correction, on each of the divided light emitting regions, which have been inputted into the corresponding light-source drive section. Here, the control of the LED luminance output may be performed by the duty control in the PWM (Pulse Width Modulation) control, or by the control of the amount of an LED drive current.

As mentioned above, the color sensor 16 is arranged together with the first temperature sensor 17 on the LED mounting board 7c mounted inside the backlight source 7. On the condition of being controlled on the basis of the luminance output values ($dr'_{(m, n)}$, $dg'_{(m, n)}$, $db'_{(m, n)}$) of the R-LEDs, G-LEDs, and B-LEDs of the divided light emitting regions to be driven and controlled, the color detecting section 13 measures the light emitting state of the divided light emitting regions through the color sensor 16, and the color sensor measurement values (Sr, Sg, Sb) are sent to the computing section 11. Hereafter, the luminance output values at a time (t) are referred to as ($dr'_{(m, n)}$ (t), $dg'_{(m, n)}$ (t), $db'_{(m, n)}$ (t)) and the color sensor measurement values on the condition of having been controlled based on the luminance output values are referred to as (Sr(t), Sg(t), and Sb(t)).

In the memory section 12, target color sensor values (Sr0, Sg0, S0) and temperature correction coefficients (βr, βg, βb) of the color sensor 16 have been recorded beforehand, and those are sent to the computing section 11. In this example, the first temperature sensor 17 is arranged in the vicinity of the color sensor 16, and the temperature of the color sensor 16 is obtained from measurement value (T1) of the first temperature sensor 17. Accordingly, the computing section 11 calculates target color sensor values (Sr0', Sg0', Sb0') at a time (t) by the following expressions (S107).

$$Sr0'=Sr0+\beta r \times (T1-T0) \quad (8)$$

$$Sg0'=Sg0+\beta g \times (T1-T0) \quad (9)$$

$$Sb0'=Sb0+\beta b \times (T1-T0) \quad (10)$$

In the expression 8 to 10, Sr0', Sg0' and Sb0' are target color sensor values after the temperature correction, Sr0, Sg0 and Sb0 are target color sensor values, and βr, βg and βb are color sensor temperature correction coefficients.

In the memory section 12, color sensor values (Sr0, Sg0, Sb0) and the inverse matrix (Smat$^{-1}$) of the relational matrix of the luminance output values ($dr_{(m, n)}$, $dg_{(m, n)}$, $db_{(m, n)}$) of the R-LEDs, G-LEDs, and B-LEDs have been recorded beforehand, and those are sent to the computing section 11.

$$Smat_{(m,n)} = \begin{pmatrix} Smat\_rr_{(m,n)} & Smat\_gr_{(m,n)} & Smat\_br_{(m,n)} \\ Smat\_rg_{(m,n)} & Smat\_gg_{(m,n)} & Smat\_bg_{(m,n)} \\ Smat\_rb_{(m,n)} & Smat\_gb_{(m,n)} & Smat\_bb_{(m,n)} \end{pmatrix} \quad (11)$$

The computing section 11 calculates the luminance output values ($dr'_{(m, n)}(t+\Delta t)$, $dg'_{(m, n)}(t+\Delta t)$, $db'_{(m, n)}(t+\Delta t)$) of the R-LEDs, G-LEDs, and B-LEDs at the next time (t+Δt), on the basis of a difference of the target color sensor values (Sr0', Sg0', Sb0') at the time (t) and the color sensor measurement values (Sr (t), Sg (t), Sb (t)), and the inverse matrix (Smat$^{-1}$), by the following expression (S108).

$$\begin{pmatrix} dr'_{(m,n)}(t+\Delta t) \\ dg'_{(m,n)}(t+\Delta t) \\ db'_{(m,n)}(t+\Delta t) \end{pmatrix} = \begin{pmatrix} dr'_{(m,n)}(t) \\ dg'_{(m,n)}(t) \\ db'_{(m,n)}(t) \end{pmatrix} - Smat_{(m,n)}-1 \times \begin{pmatrix} Sr(t)-Sr0' \\ Sg(t)-Sg0' \\ Sb(t)-Sb0' \end{pmatrix} \quad (12)$$

In the expression 12, $dr'_{(m, n)}(t+\Delta t)$, $dg_{(m, n)}(t+\Delta t)$ and $db'_{(m, n)}(t+\Delta t)$ are the luminance output values of the R-LEDs, G-LEDs, and B-LEDs at the time (t+Δt), $dr'_{(m, n)}(t)$, $dg'_{(m, n)}(t)$ and $db'_{(m, n)}(t)$ are the luminance output values of the R-LEDs, G-LEDs, and B-LEDs at the time (t), Sr (t), Sg (t) and Sb (t) are color sensor measurement values, and Sr0', Sg0' and Sb0' are target color sensor values after the temperature correction.

The calculated luminance output values ($dr'_{(m, n)}(t+\Delta t)$, $dg'_{(m, n)}(t+\Delta t)$, $db'_{(m, n)}(t+\Delta t)$) of the R-LEDs, G-LEDs, and B-LEDs at the next time (t+Δt) are sent to the light-source drive sections, and the divided light emitting regions are driven and controlled individually with these values (S109).

The above operations are performed repeatedly during a given period of time (Δt), whereby the temperature sensor and the color sensor are constituted to perform the feedback control. Accordingly, it becomes possible to improve luminance unevenness (ununiformity of luminance within the backlight surface), color unevenness (ununiformity of chromaticity within the backlight surface), and a change of white balance in the display region irrespective of the aging change of the LED and the temperature conditions.

Figure 15A:
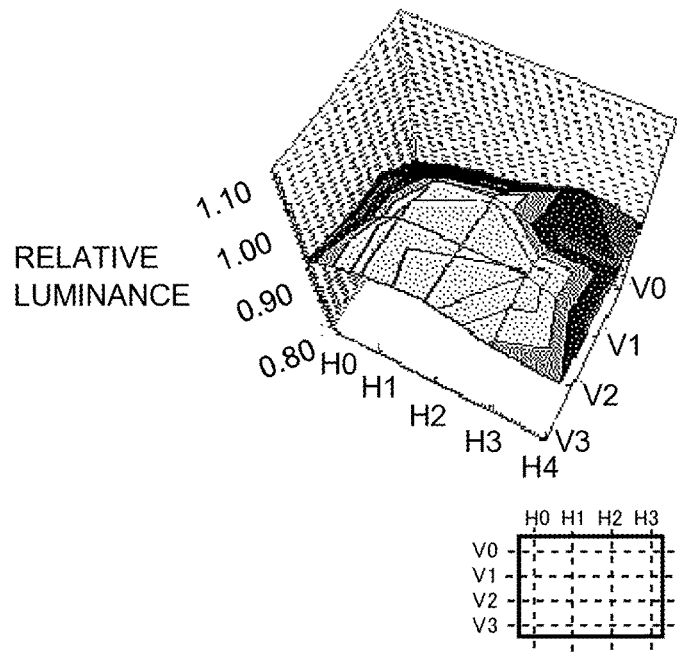
FIGS. 15A and 15B are diagrams for comparing a relative luminance distribution between the present example and a conventional example.
Figure 15B:
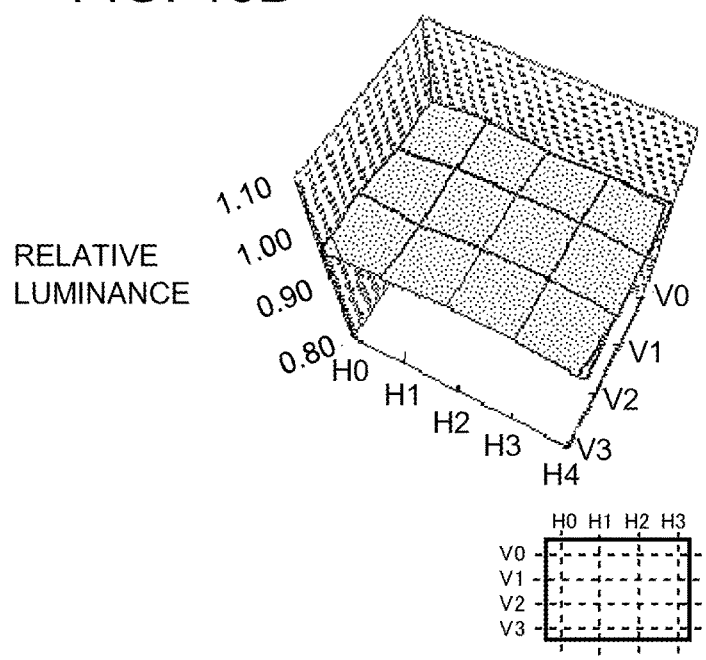
Figure 16A:
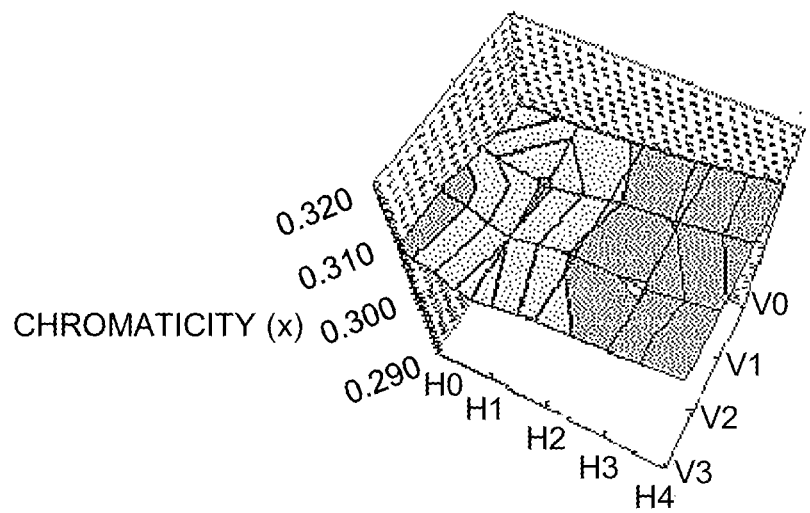
FIGS. 16A to 16D are diagrams for comparing a chromaticity distribution between the present example and a conventional example.
Figure 16B:
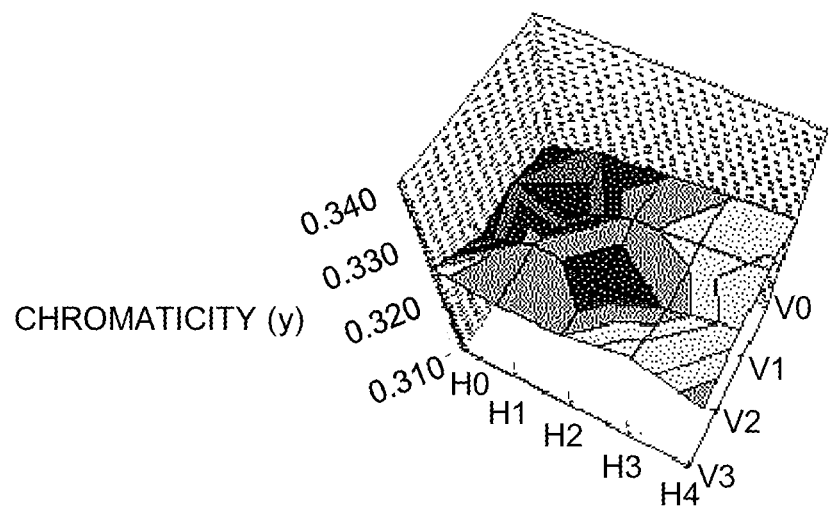
Figure 16C:
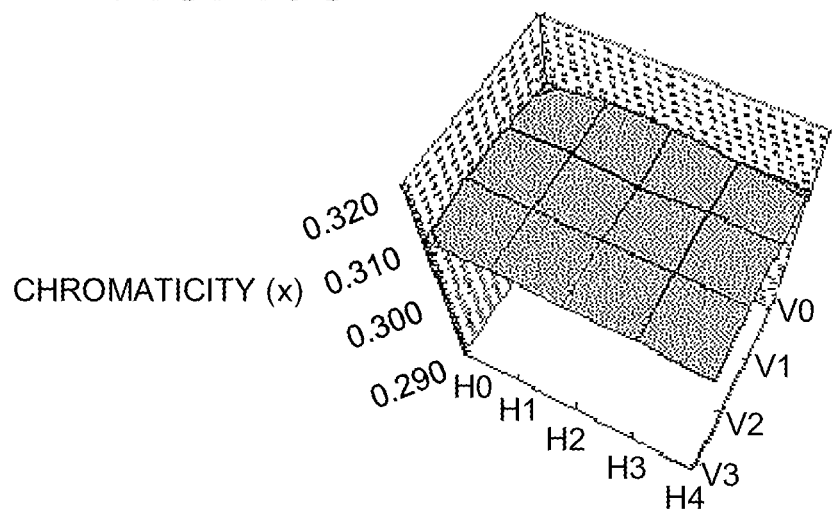
Figure 16D:
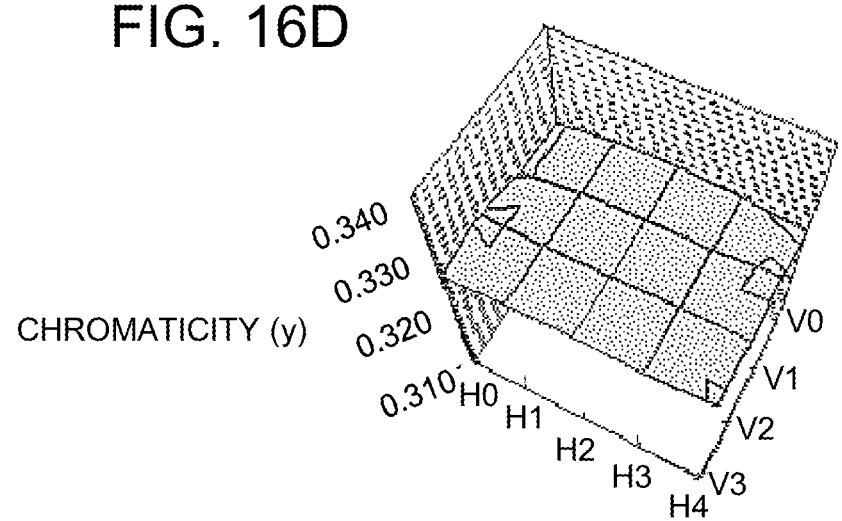

FIG. 15A illustrates a relative luminance distribution according the constitution of the conventional example (in a temperature-saturated state), and FIG. 15B illustrates a relative luminance distribution according to the constitution of the present example (in a temperature-saturated state). FIGS. 16A and 16B illustrate a chromaticity distribution according the constitution of the conventional example (in a temperature-saturated state), and FIGS. 16C and 16D illustrate a chromaticity distribution according to the constitution of the present invention (in a temperature-saturated state). As can be seen from the graphs, each of the relative luminance and the chromaticity becomes in-plane uniform and the luminance unevenness (ununiformity of luminance within the backlight surface) of the display region, the color unevenness (ununiformity of chromaticity within a backlight surface) and a change of white balance are improved.

Figure 17A:
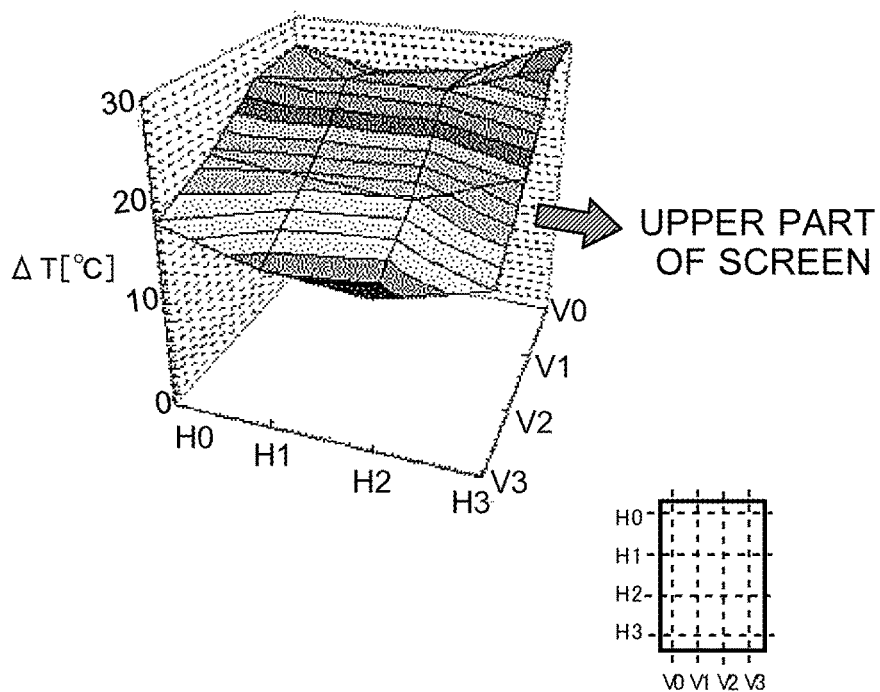
FIGS. 17A and 17B each is a diagram illustrating temperature changes and temperature change coefficients of divided light emitting regions in a portrait arrangement of the planar lighting apparatus according to the first example.
Figure 17B:
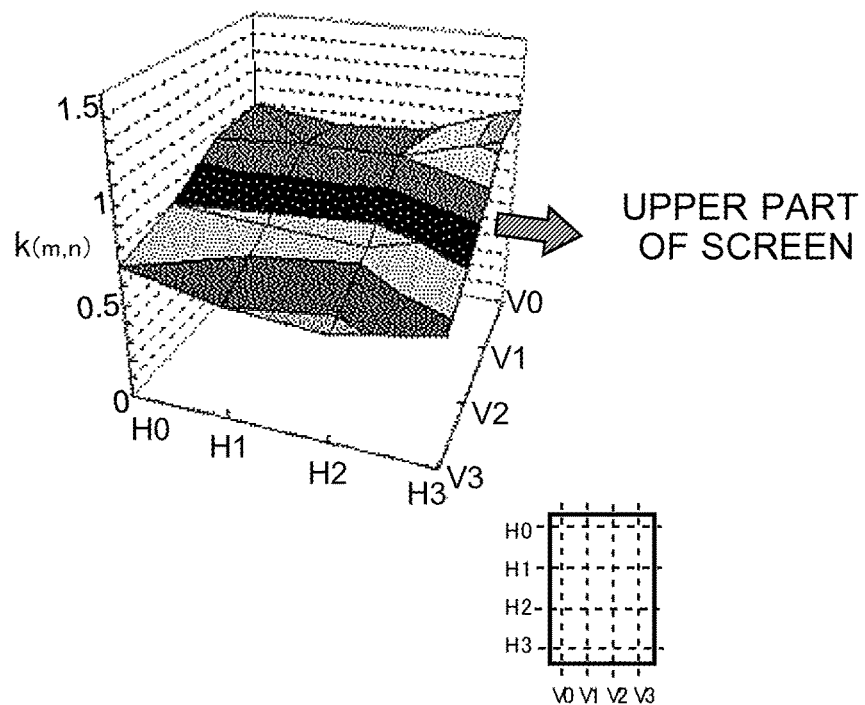

FIGS. 17A and 17B illustrate a temperature change and temperature change coefficients of each portion of the divided light emitting regions at the inside of the first housing 7a of the backlight source 7 in the case where the liquid crystal display apparatus 1 of this example is made into a portrait arrangement, where the white luminance is 400 cd/m² and the ambient temperature is 25° C. As can be seen from FIGS. 17A and 17B, the temperature distribution becomes different from that in the landscape arrangement in FIGS. 7A to 12B. In such an arrangement, by changing the setup values memorized in the memory section 12 with the portrait arrangement and the landscape arrangement, it becomes possible to perform the control of this example.

Figure 18A:
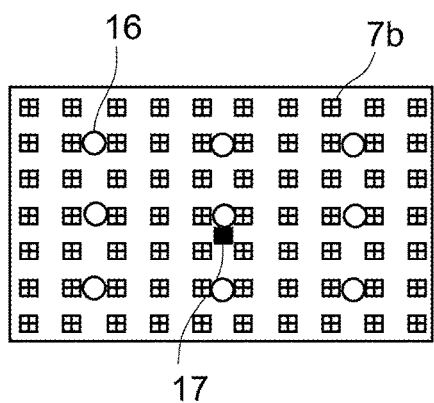
FIGS. 18A, 18B, and 18C each is a diagram illustrating another example of a constitution of the backlight source according to the first example.
Figure 18B:
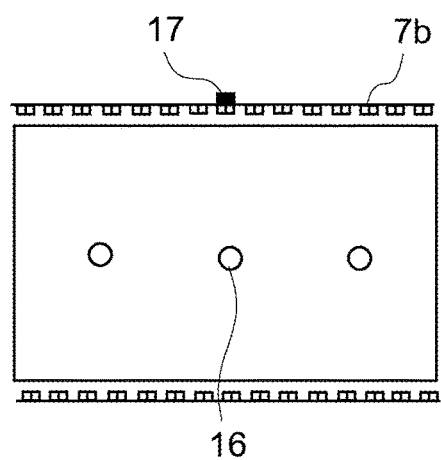
Figure 18C:
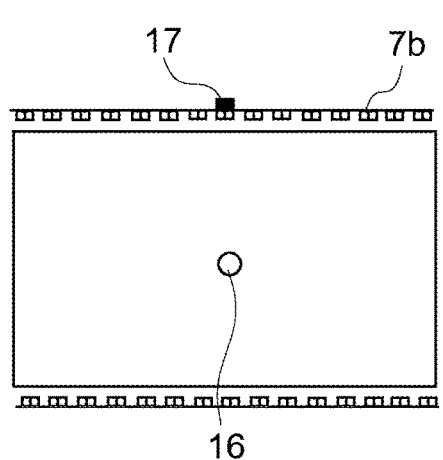
Figure 19A:
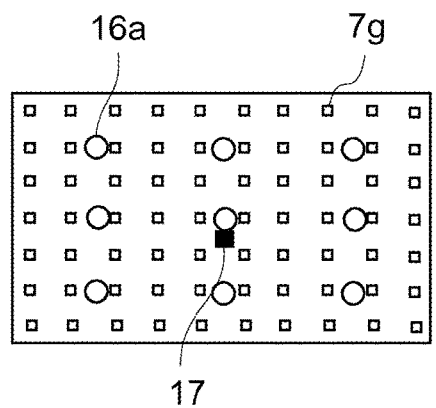
FIGS. 19A to 19D each is a diagram illustrating another example of a constitution of the backlight source according to the first example.
Figure 19B:
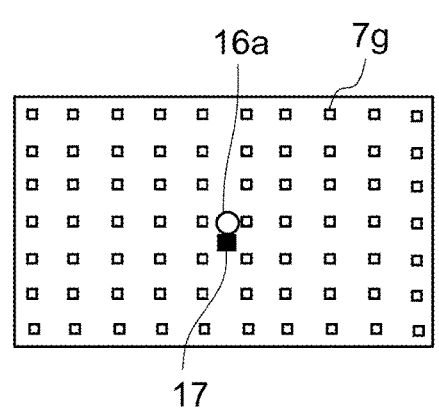
Figure 19C:
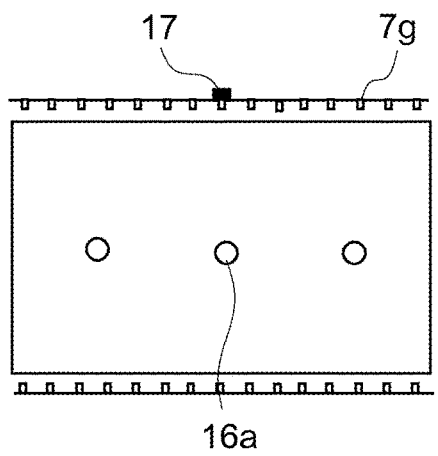
Figure 19D:
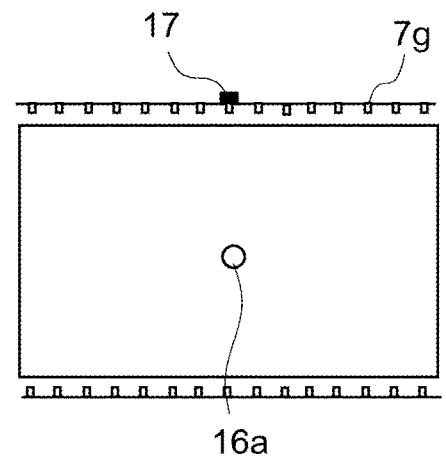

Further, each of FIGS. 18A to 18C and 19A to 19D shows another example of the backlight sources 7 of the present invention. Each of FIGS. 18A to 18C is another example in the case where multiple color LEDs such as R-LEDs, B-LEDs and G-LEDs are used in a backlight sources 7, and each of FIGS. 19A to 19D is another example in the case where white LEDs is used in backlight sources 7. As shown in FIG. 18A, the constitution of the backlight sources 7 is not limited to the case where the number of color sensor 16 is one, and plural color sensors may be used. Further, although the direct-type backlight source in which the LEDs are mounted on the rear surface of the liquid crystal display apparatus 1 is used in the above-mentioned example, an edge-type backlight source in which LEDs are mounted on sides of the liquid crystal display apparatus 1 may be used as illustrated in FIGS. 18B and 18C.

Furthermore, as illustrated in FIGS. 19A to 19D, in the above-mentioned example, the LED light sources are constituted by the LEDs with multiple colors being R-LEDs, G-LEDs and B-LEDs. Alternatively, the LED light sources can be constituted by white LEDs. In the case of constituting with only white LEDs, since there is no need to measure the luminance of each color, it may be enough to use an optical sensor 16a, not the color sensor 16.

EXAMPLE 2

Figure 20:
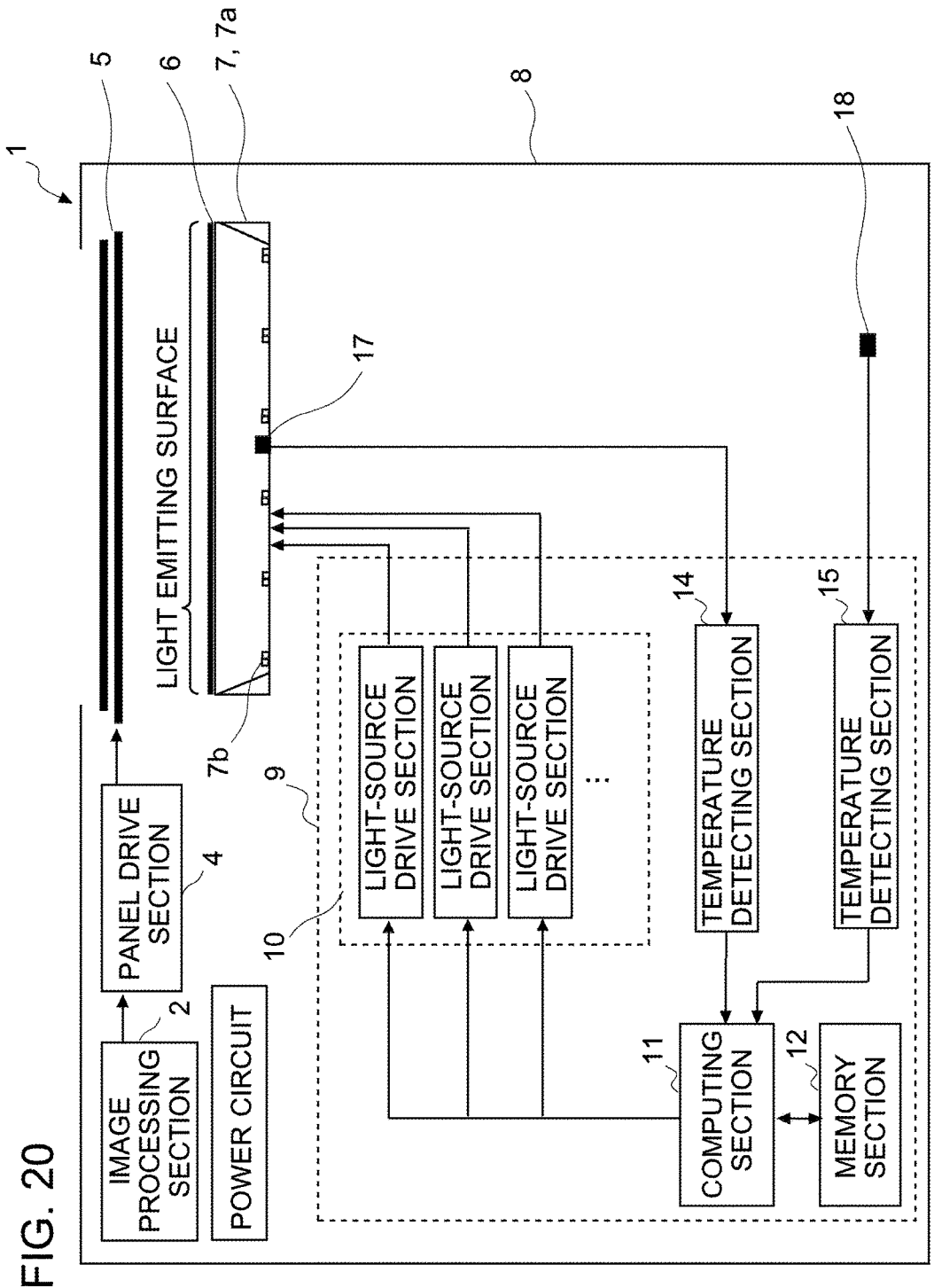
FIG. 20 is a block diagram schematically illustrating a constitution of a liquid crystal display apparatus according to the second example.

Next, description is given to a planar lighting apparatus and a liquid crystal display apparatus according to the second example with reference to FIG. 20.

As illustrated in FIG. 20, this example provides a liquid crystal display apparatus, and the liquid crystal display apparatus 1 of this example includes a liquid crystal panel 5; a planar light source (a backlight source 7 in this example); and a second housing 8 which covers the backlight source 7. The planar light source includes a first housing 7a which covers the plural light emitting elements with single color or multiple colors to form a light emitting surface shaped in a flat surface or a curved surface (on an optical sheet 6), where the light emitting surface is divided into plural light emitting regions. Here, the backlight source 7 and the second housing 8 form a part of the planar lighting apparatus (the plane-type lighting system) of the present example. The planar lighting apparatus further includes a light-source drive circuit 10, a computing section 11, and a memory section 12 adapted to memorize setup information. The light-source drive circuit 10 includes plural light-source drive sections each adapted to drive and control light emitting elements belonging to the corresponding divided light emitting regions. The computing section 11 is adapted to calculate a driving condition of each of the plural light-source drive sections. Further, the planar lighting apparatus includes at least one first temperature sensor 17 disposed inside of the first housing 7a of the backlight source land at least one second temperature sensor 18 disposed outside of the first housing 7a and inside of the second housing 8. The computing section 11 is configured to correct the driving condition of each of the plural light-source drive sections on the basis of the measurement value of the first temperature sensor 17 obtained by a temperature detecting section 14, the measurement value of the second temperature sensor 18 obtained by a temperature detecting section 15, and the setup information in the memory section 12. That is, this example has a constitution that the color sensor 16 and the color detecting section 13 in the first example are omitted.

Since this example does not use a color sensor, a characteristic change due to the aging change of LEDs cannot be corrected. However, it is possible to reduce luminance unevenness (ununiformity of luminance within the backlight surface) of the display region, color unevenness (ununiformity of chromaticity within the backlight surface), and a change of white balance under a temperature change from the start of lighting to the temperature saturation.

EXAMPLE 3

Figure 21:
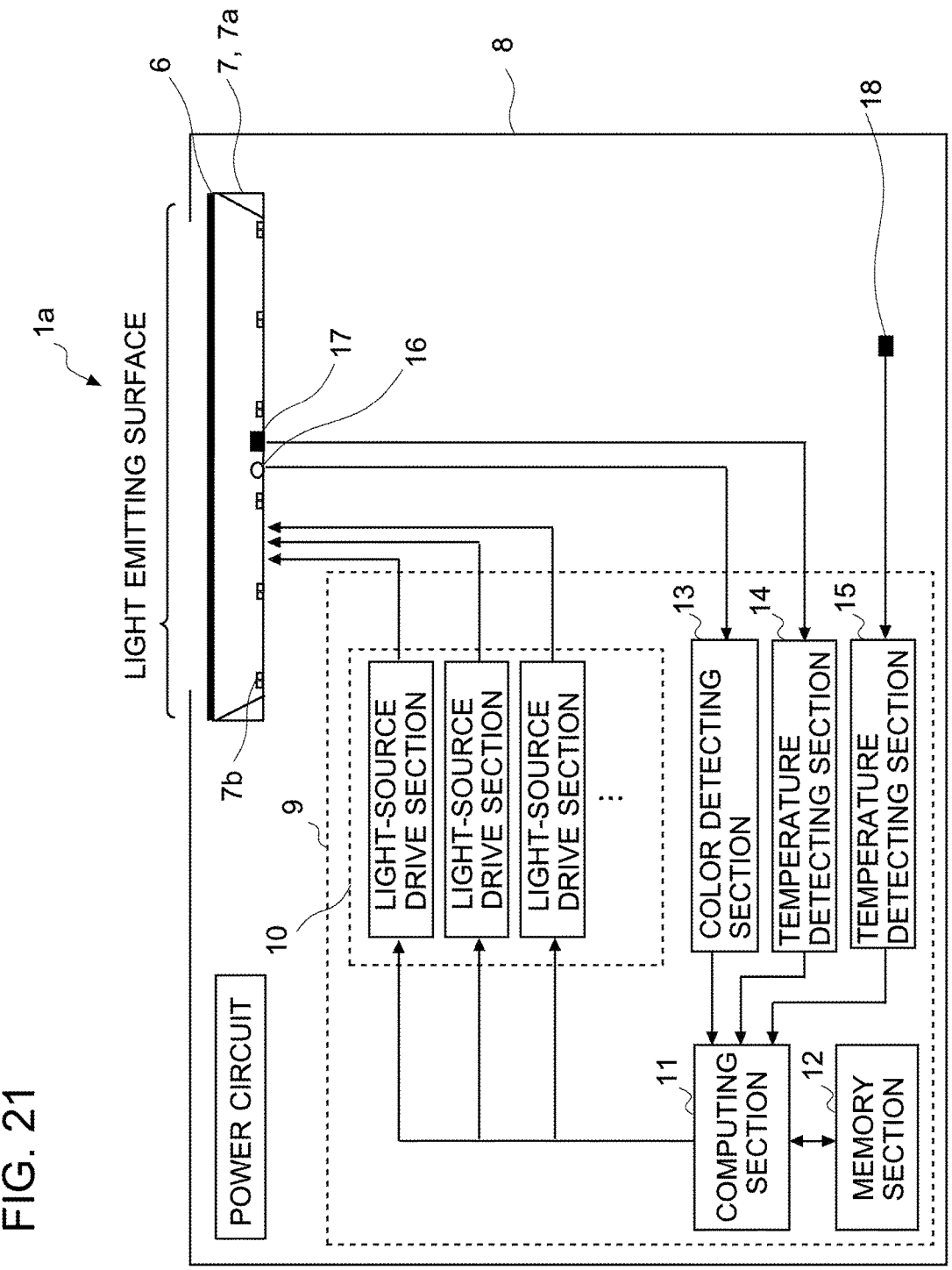
FIG. 21 is a block diagram schematically illustrating a constitution of a liquid crystal display apparatus according to the third example.

Next, description is given to a planar lighting apparatus according to the third example with reference to FIG. 21.

As illustrated in FIG. 21, this example provides a planar lighting apparatus, and the planar lighting apparatus 1a of this example includes a planar light source 7; and a second housing 8 which covers the planar light source 7. The planar light source 7 includes a first housing 7a which covers therein plural light emitting elements with single color or multiple colors to form a light emitting surface shaped in a flat surface or a curved surface (on an optical sheet 6), where the light emitting surface is divided into multiple light emitting regions. The planar lighting apparatus 1a further includes a light-source drive circuit 10, a computing section 11, and a memory section 12 adapted to memorize setup information. The light-source drive circuit 10 includes plural light-source drive sections each adapted to drive and control light emitting elements belonging to the corresponding divided light emitting regions. The computing section 11 is adapted to calculate a driving condition of each of the plural light-source drive sections. Further, there are at least one color sensor (or optical sensor) 16 disposed inside of the first housing 7a of the planar lighting apparatus 7, at least one first temperature sensor 17 disposed inside of the first housing 7a, and at least one second temperature sensor 18 disposed outside of the first housing 7a and inside of the second housing 8. The computing section 11 is configured to correct the driving condition of each of the plural light-source drive sections on the basis of at least the measurement value of the color sensor (or optical sensor) 16 obtained by a color detecting section 13, the measurement value of the first temperature sensor 17 measured by a temperature detecting section 14, the measurement value of the second temperature sensor 18 obtained by a temperature detecting section 15, and the setup information in the memory section 12.

This example is an embodiment in which the planar light source 7 is applied to the planar lighting apparatus 1a, and as with the first examples, also in the planar lighting apparatus la, it is possible to improve the luminance unevenness (ununiformity of luminance within the backlight surface) and color unevenness (ununiformity of chromaticity within the backlight surface) of the lighting region, and a change of white balance.

EXAMPLE 4

Figure 22:
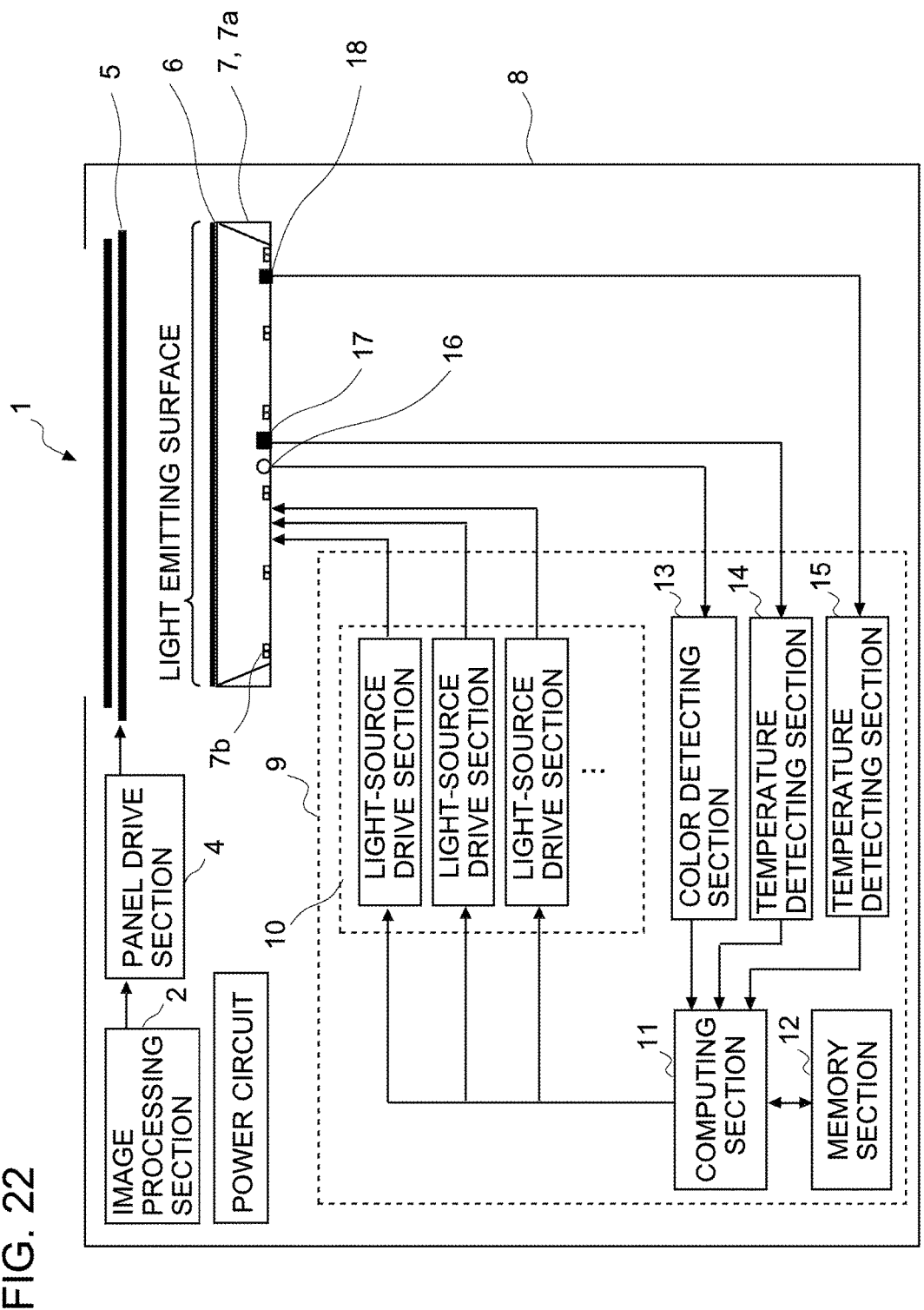
FIG. 22 is a block diagram schematically illustrating a constitution of a liquid crystal display apparatus according to the fourth example.

Next, description is given to a planar lighting apparatus and a liquid crystal display apparatus according to the fourth example with reference to FIG. 22.

As illustrated in FIG. 22, this example provides a liquid crystal display apparatus, and the liquid crystal display apparatus 1 of this example includes a liquid crystal panel 5; a planar light source (a backlight source 7 in this example); and a second housing 8 which covers the backlight source 7. The planar light source includes a first housing 7a which covers the plural light emitting elements with single color or multiple colors to form a light emitting surface shaped in a flat surface or a curved surface (on an optical sheet 6), where the light emitting surface is divided into plural light emitting regions. Here, the backlight source 7 and the second housing 8 form a part of the planar lighting apparatus (the plane-type lighting system) of the present example. The planar lighting apparatus further includes a light-source drive circuit 10, a computing section 11, and a memory section 12 adapted to memorize setup information. The light-source drive circuit 10 includes plural light-source drive sections each adapted to drive and control light emitting elements belonging to the corresponding divided light emitting regions. The computing section 11 is adapted to calculate a driving condition of each of the plural light-source drive sections. Further, the planar lighting apparatus further includes at least one color sensor (or optical sensor) 16 disposed inside of the first housing 7a of the backlight source 7, at least one first temperature sensor 17 disposed inside of the first housing 7a and at least one second temperature sensor 18 disposed inside of the first housing 7a. The computing section 11 is configured to correct the driving condition of each of the plural light-source drive sections on the basis of at least the measurement value of the color sensor (or optical sensor) 16 obtained by a color detecting section 13, the measurement value of the first temperature sensor 17 obtained by a temperature detecting section 14, the measurement value of the second temperature sensor 18 obtained by a temperature detecting section 15, and the setup information in the memory section 12. That is, this example has a constitution that the second temperature sensor 18 of the first example is disposed at the inside of the first housing 7a.

This example cannot measure the ambient temperature with the second temperature sensor 18. However, if the first temperature sensor 17 and the second temperature sensor 18 of the inner portion of the first housing 7a are arranged at the respective regions where an in-plane temperature difference of the backlight source 7 is large, as with the first example, it is possible to improve luminance unevenness (ununiformity of luminance within the backlight surface) and the color unevenness (ununiformity of chromaticity within the backlight surface) of the display region, and a change of white balance.

EXAMPLE 5

Figure 23:
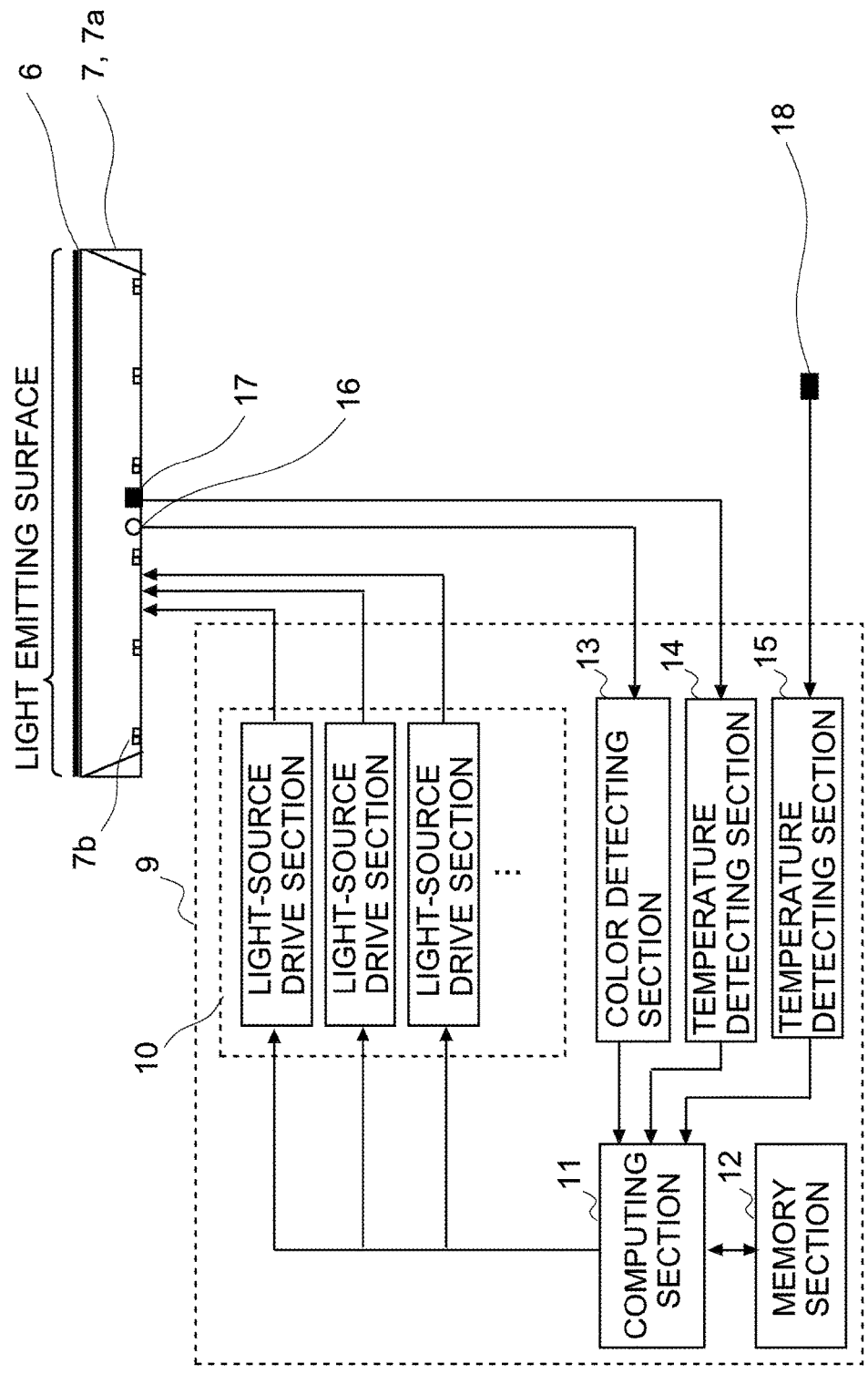
FIG. 23 is a block diagram schematically illustrating a constitution of a liquid crystal display apparatus according to the fifth example.
Figure 24:
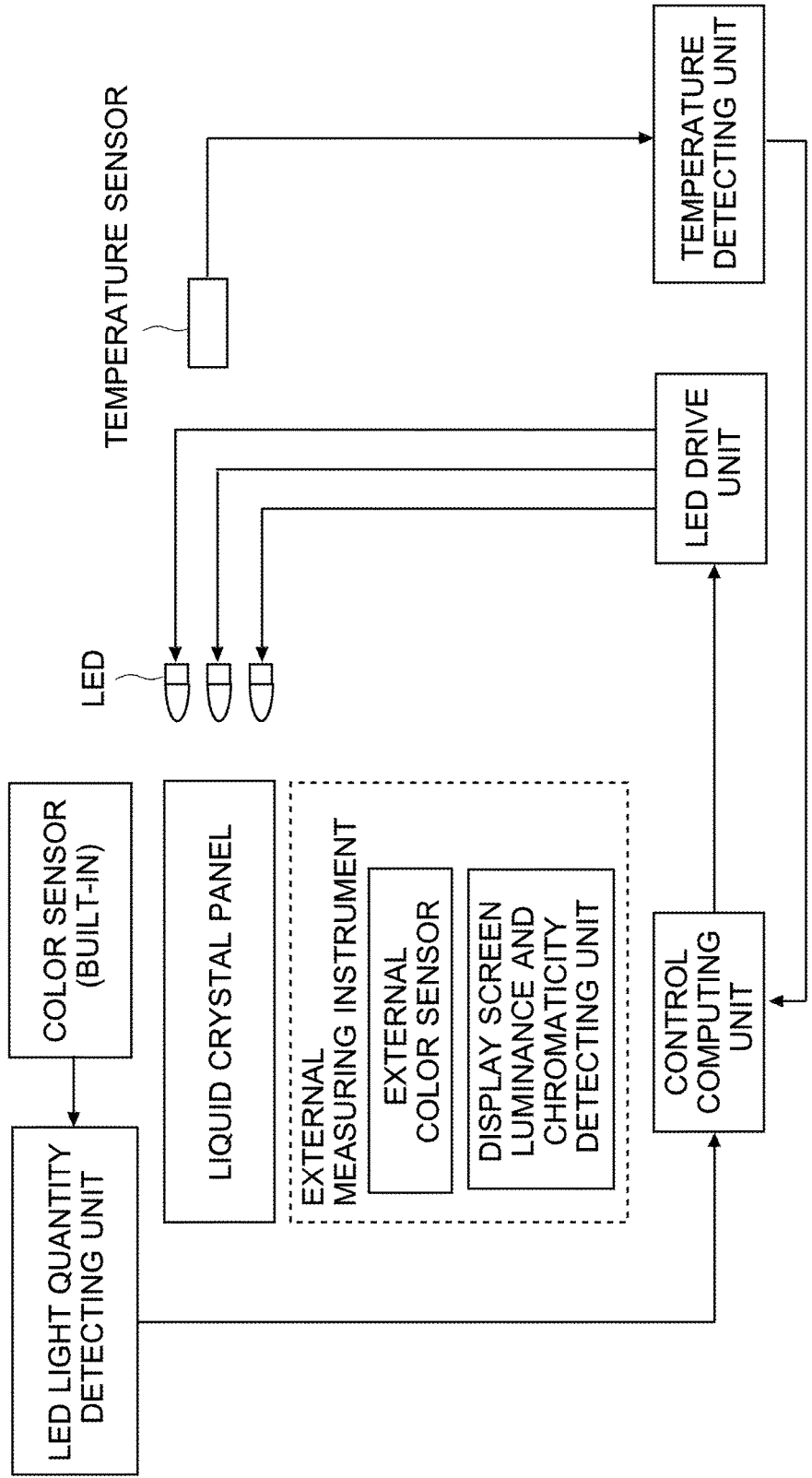
FIG. 24 is a block diagram showing schematically a constitution of a liquid crystal display apparatus as a conventional art (JP-A No. 2006-276784)
Figure 25:
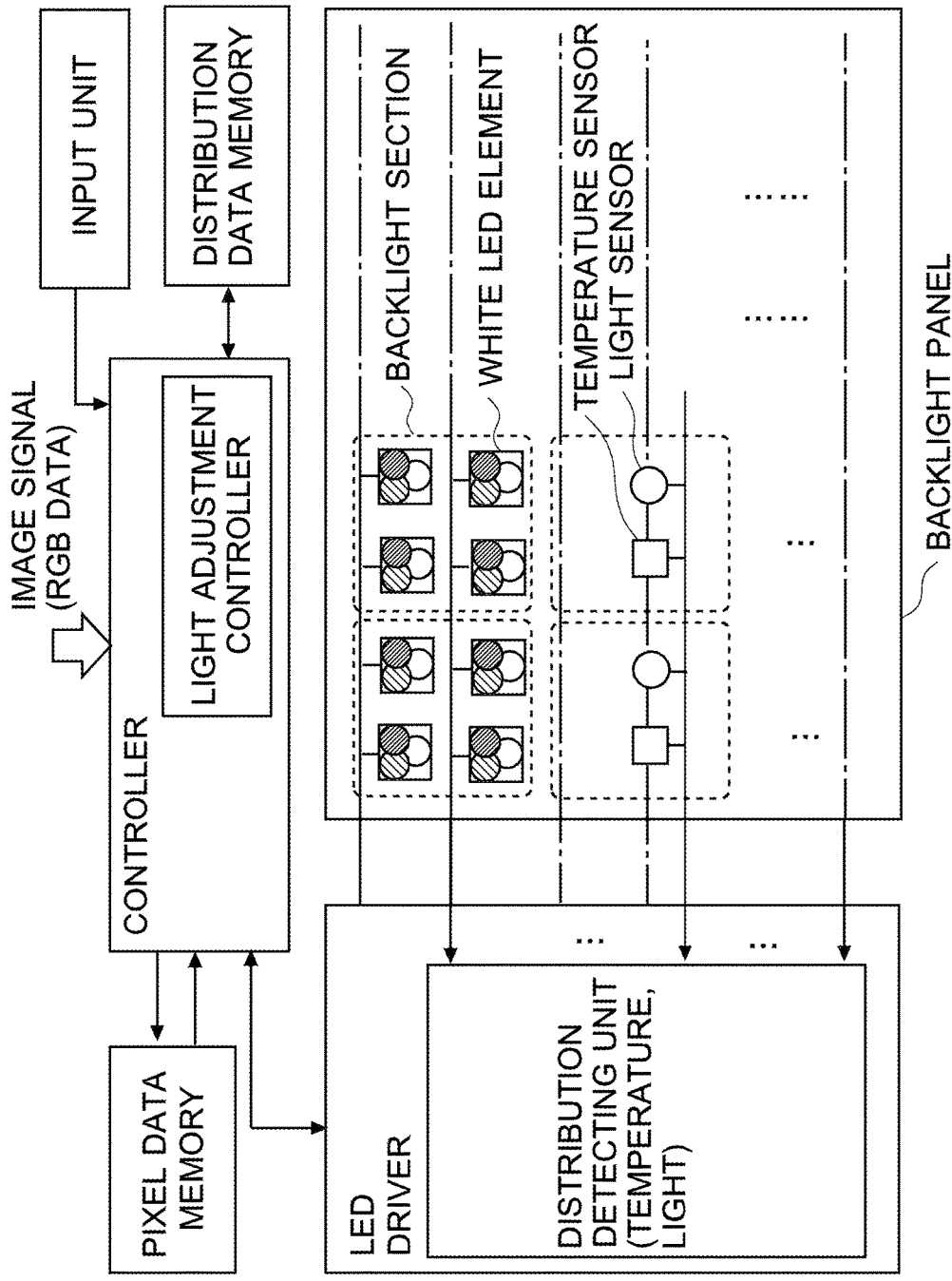
FIG. 25 is a block diagram showing schematically a constitution of a liquid crystal display apparatus as a conventional art (JP-A No. 2008-249780)
Figure 26:
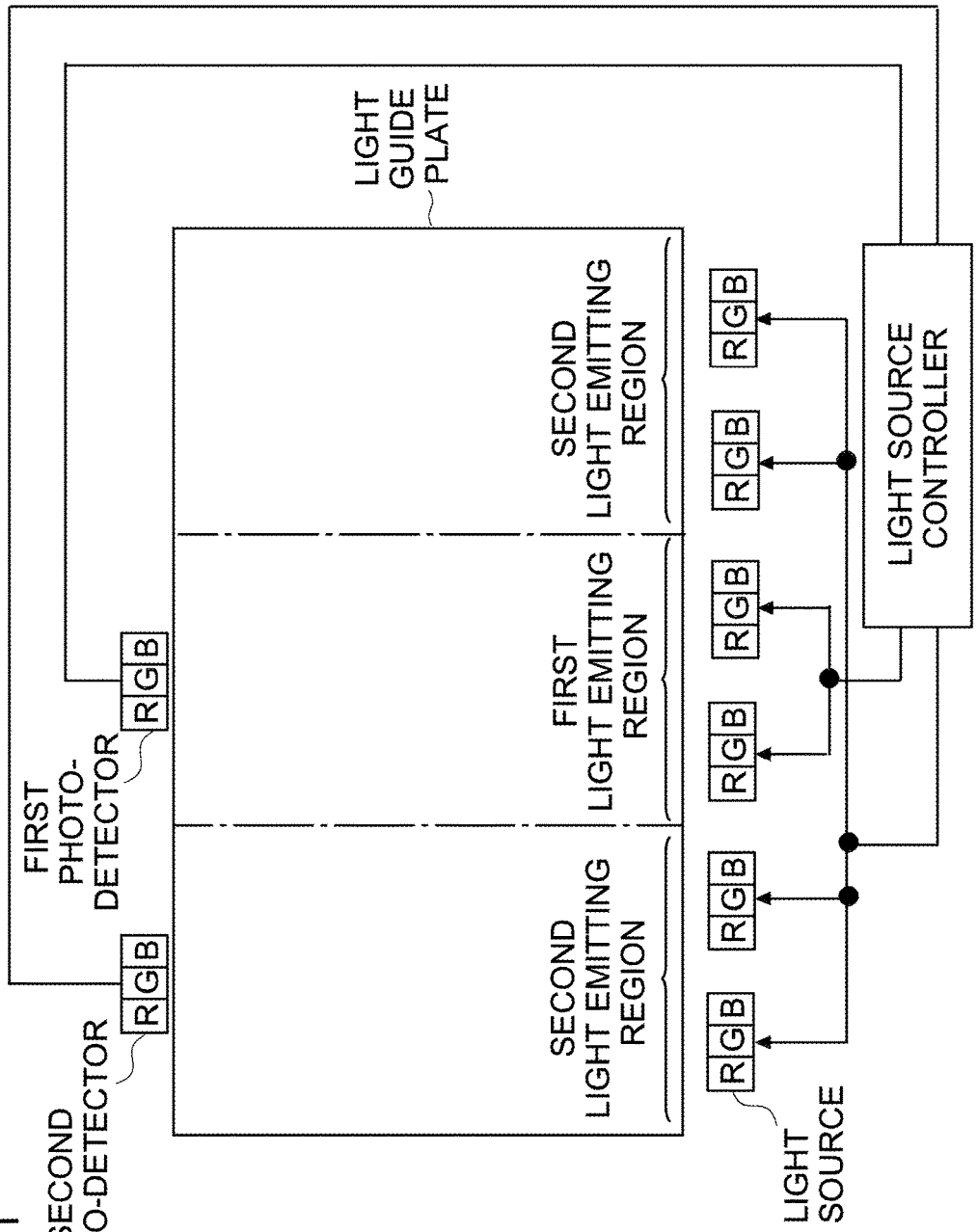
FIG. 26 is a block diagram showing schematically a constitution of a lighting apparatus as a conventional art (JP-A No. 2007-317479)
Figure 27:
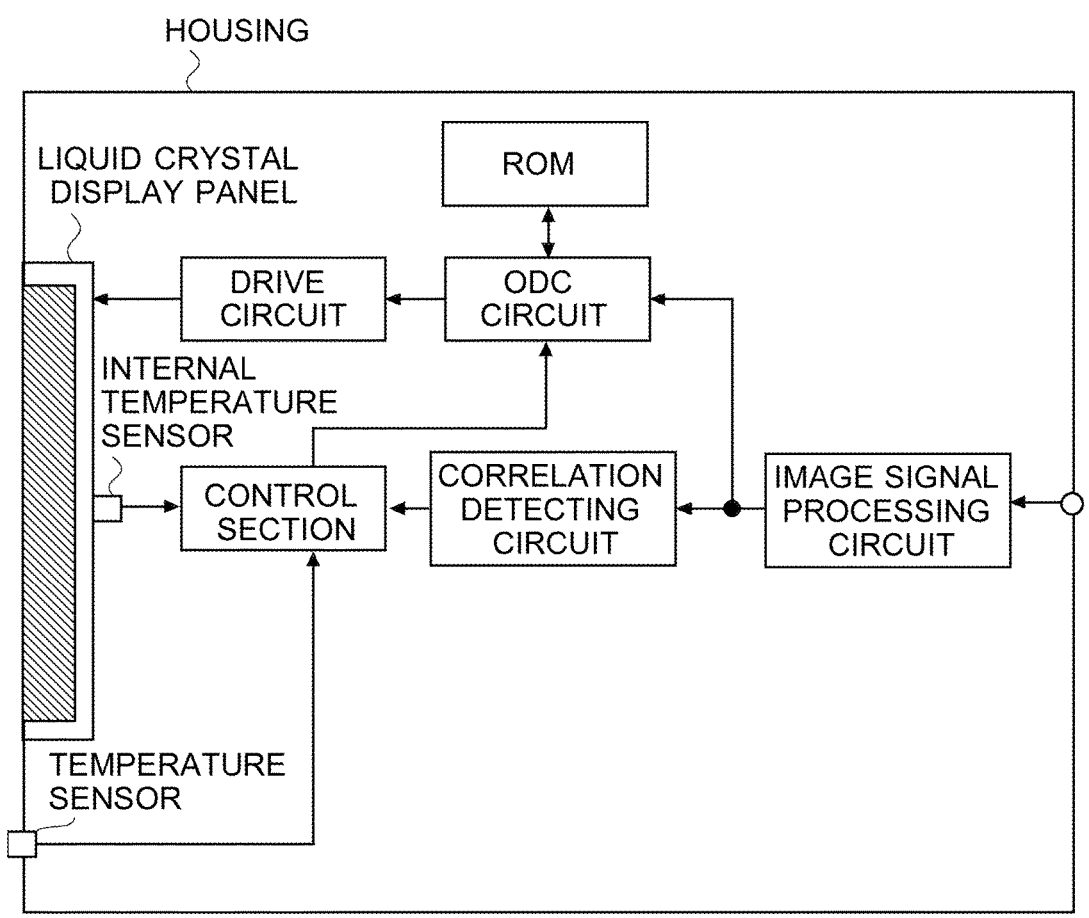
FIG. 27 is a block diagram showing schematically a constitution of a liquid crystal display apparatus as a conventional art (JP-A No. 2006-126627).

Next, description is given to a planar light source according to the fifth example with reference to FIG. 23.

As illustrated in FIG. 23, this example provides a planar light source used as a backlight unit of a liquid crystal display. The planar lighting apparatus is a planar light source 7 including a first housing 7a which covers the plural light emitting elements with single color or multiple colors to form a light emitting surface shaped in a flat surface or a curved surface (on an optical sheet 6), where the light emitting surface is divided into multiple light emitting regions. There are provided a light-source drive circuit 10, a computing section 11, and a memory section 12 adapted to memorize setup information, together with the planar light source 7. The light-source drive circuit 10 includes plural light-source drive sections each adapted to drive and control light emitting elements belonging to the corresponding divided light emitting regions. The computing section 11 is adapted to calculate a driving condition of each of the plural light-source drive sections. Further, there are at least one color sensor (or optical sensor) 16 disposed inside of the first housing 7a of the planar light source 7, at least one first temperature sensor 17 disposed inside of the first housing 7a, and at least one second temperature sensor 18 disposed outside of the first housing 7a and at the rear surface side of the first housing 7a. The computing section 11 is configured to correct the driving condition of each of the plural light-source drive sections on the basis of at least the measurement value of the color sensor (or optical sensor) 16 obtained by a color detecting section 13, the measurement value of the first temperature sensor 17 obtained by a temperature detecting section 14, the measurement value of the second temperature sensor 18 obtained by a temperature detecting section 15, and the setup information in the memory section 12.

In this example, the second temperature sensor 18 is disposed outside of the first housing 7a and at the rear surface side of the first housing 7a, whereby the second temperature sensor 18 is covered within the second housing at the time of being used in the liquid crystal display apparatus. Accordingly, it becomes possible to obtain the same effect as that in the first example.

The present invention should not be limited to the above embodiments and examples, and as long as not deviating from the intention of the present invention, the constitution, configuration, and control method of the liquid crystal display apparatus and the planar light source apparatus can be changed appropriately.

The present invention can be used for a planar lighting apparatus and a liquid crystal display apparatus which uses the planar lighting apparatus as a light source.

The invention claimed is:
1. A planar lighting apparatus comprising:
a planar light source including
a plurality of light emitting elements with single color or multiple colors,
a first housing which covers the plurality of light emitting elements,
a light emitting surface formed by the plurality of light emitting elements and divided into a plurality of light emitting regions, and
a first temperature sensor disposed inside of the first housing;
a second housing which covers the planar light source;
a second temperature sensor disposed outside of the first housing and inside of the second housing;
a light-source drive circuit including a plurality of light-source drive sections each of which drives and controls the light emitting elements belonging to the corresponding light emitting region;
a memory section to memorize setup information including temperature change coefficients of the light emitting regions; and
a computing section which calculates a driving condition of each of the plurality of light-source drive sections, calculates temperatures of the light emitting regions by using a measurement value of the first temperature sensor, a measurement value of the second temperature sensor, and the setup information in the memory section, and corrects the driving condition of each of the plurality of light-source drive sections based on the calculated temperatures of the light emitting regions.

2. The planar lighting apparatus of claim 1, wherein the planar light source further includes an optical sensor or a color sensor disposed inside of the first housing, and the computing section corrects the driving condition of each of the plurality of light-source drive sections based on a measurement value of the optical sensor or the color sensor, the measurement value of the first temperature sensor, the measurement value of the second temperature sensor, and the setup information in the memory section.

3. The planar lighting apparatus of claim 1, wherein the computing section calculates temperatures of the light emitting regions by using the measurement value of the first temperature sensor and the measurement value of the second temperature sensor, and corrects the driving condition of each of the plurality of light-source drive sections on a basis of the calculated temperatures of the light emitting regions.

4. The planar lighting apparatus of claim 3, wherein the computing section calculates a representative value of temperature changes inside of the first housing by using a difference between the measurement value of the first temperature sensor and the measurement value of the second temperature sensor, calculates temperature changes in the light emitting regions by using the calculated representative value of the temperature changes and temperature change coefficients of the light emitting regions, the temperature change coefficients being memorized in the memory section, each of the temperature change coefficients being a ratio of a corresponding one of the temperature changes of the respective light emitting regions to the representative value of temperature changes inside of the first housing, calculates temperatures of the light emitting regions by using the temperature changes of the light emitting regions and the measurement value of the second temperature sensor, and corrects the driving condition of each of the plurality of light-source drive sections on a basis of the calculated temperatures of the light emitting regions.

5. The planar lighting apparatus of claim 1, wherein the planar light source further includes a mounting board of the light emitting elements in the first housing, and the first temperature sensor is disposed on the mounting board.

6. The planar lighting apparatus of claim 5, wherein the planar light source further includes a heat conductive sheet in the first housing, the mounting board of the light emitting elements is disposed on the first housing, and the heat conductive sheet is arranged between the mounting board and the first housing.

7. The planar lighting apparatus described in claim 1, further comprising a board configured to drive the light emitting elements, disposed outside of the first housing, wherein the second temperature sensor is disposed on the board that drives the plurality of light emitting elements.

8. The planar lighting apparatus described in claim 7, further comprising a heat insulating sheet on a rear surface of the first housing, wherein the board that drives the light emitting elements is disposed on the rear surface of the first housing with the heat insulating sheet put between the board for driving the light emitting elements and the first housing.

9. A liquid crystal display apparatus comprising:

a liquid crystal panel; and the planar lighting apparatus of claim 1 that is a backlight unit configured to light the liquid crystal panel.

10. A planar light source for use in a planar lighting apparatus, the planar light source comprising:

a plurality of light emitting elements with single color or multiple colors;

a first housing which covers the plurality of light emitting elements;

a light emitting surface formed by the plurality of light emitting elements and divided into a plurality of light emitting regions; and a first temperature sensor disposed inside of the first housing, wherein the planar lighting apparatus comprises the planar lighting source, a second housing which covers the planar light source, a second temperature sensor disposed outside of the first housing and inside of the second housing, a light-source drive circuit including a plurality of light-source drive sections each of which drives and controls the light emitting elements belonging to the corresponding light emitting region, a memory section to memorize setup information including temperature change coefficients of the light emitting regions, and a computing section which calculates a driving condition of each of the plurality of light-source drive sections, calculates temperatures of the light emitting regions by using a measurement value of the first temperature sensor, a measurement value of the second temperature sensor, and the setup information in the memory section, and corrects the driving condition of each of the plurality of light-source drive sections of based on the calculated temperatures of the light emitting regions.

* * * * *